United States Patent [19]

Kawai

[11] Patent Number: 4,972,226
[45] Date of Patent: Nov. 20, 1990

[54] IMAGE PROCESSING APPARATUS OPERABLE IN PLURAL OPERATION MODES

[75] Inventor: Yoshihisa Kawai, Osaka, Japan

[73] Assignee: Minolta Camera Kabushiki Kaisha, Osaka, Japan

[21] Appl. No.: 446,440

[22] Filed: Dec. 5, 1989

[30] Foreign Application Priority Data

Dec. 6, 1988 [JP] Japan .................. 63-308124

[51] Int. Cl.$^5$ .............................................. G03G 15/00
[52] U.S. Cl. ...................................... 355/202; 358/300
[58] Field of Search ............... 355/202, 200, 210; 358/300; 101/DIG. 37

[56] References Cited

U.S. PATENT DOCUMENTS

| | | | |
|---|---|---|---|
| 4,099,860 | 7/1978 | Connin | 355/314 |
| 4,315,685 | 2/1982 | Inuzuka et al. | 355/314 X |
| 4,752,806 | 6/1988 | Haas et al. | 355/202 |
| 4,754,300 | 6/1988 | Fukae | 355/202 |
| 4,794,419 | 12/1988 | Shibazaki et al. | |
| 4,821,107 | 4/1989 | Naito et al. | 355/202 X |
| 4,825,246 | 4/1989 | Fukuchi et al. | |
| 4,884,104 | 11/1989 | Yoshida | 355/202 |

FOREIGN PATENT DOCUMENTS

| | | |
|---|---|---|
| 54-104834 | 8/1978 | Japan . |
| 55-123270 | 9/1980 | Japan . |
| 56-83757 | 7/1981 | Japan . |

*Primary Examiner*—R. L. Moses
*Attorney, Agent, or Firm*—Burns, Doane, Swecker & Mathis

[57] ABSTRACT

An image processing apparatus operable in plural operation modes is disclosed. The image processing apparatus includes: a first operation mode for driving an exposure head to form dot images on a photoconductor responsive to electric signals sent from an external unit so as to form an electrostatic latent image thereon; a second operation mode for driving the exposure head to form dot images on the photoconductor responsive to the electric signals sent from the image sensor so as to form an electrostatic latent image thereon; and a third operation mode for enabling optical means to form an image reflected from a document set on the document table onto the photoconductor so as to form an electrostatic latent image thereon. A controller executes the processes of the selected one or plural operation modes responsive to the mode selection signal, and controller executes the process of the first operation mode by priority to the other operation modes when plural operation modes including the first operation mode are selected.

6 Claims, 12 Drawing Sheets

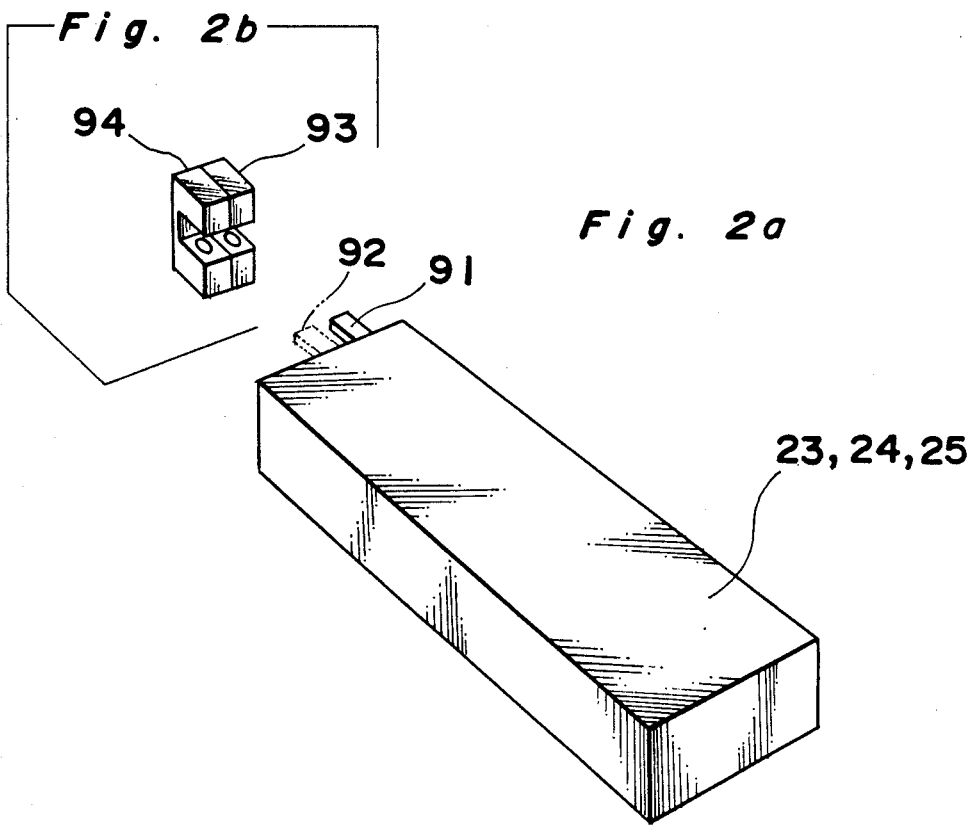
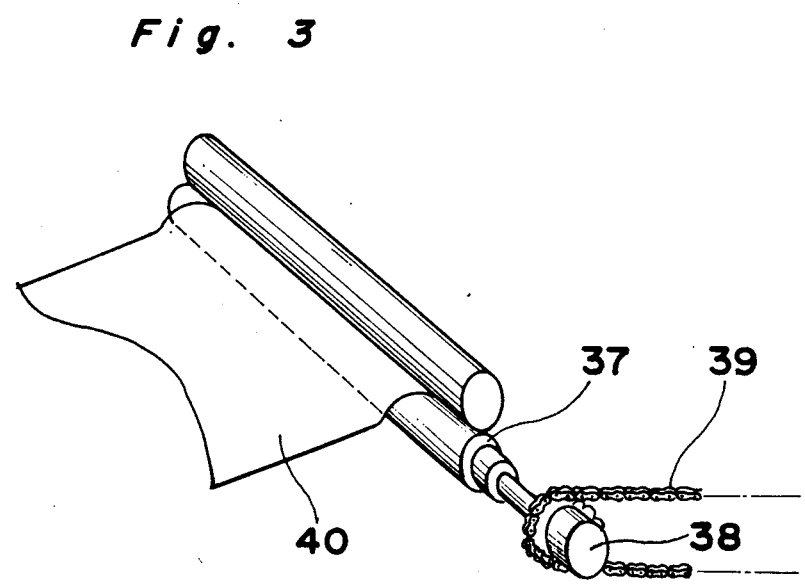

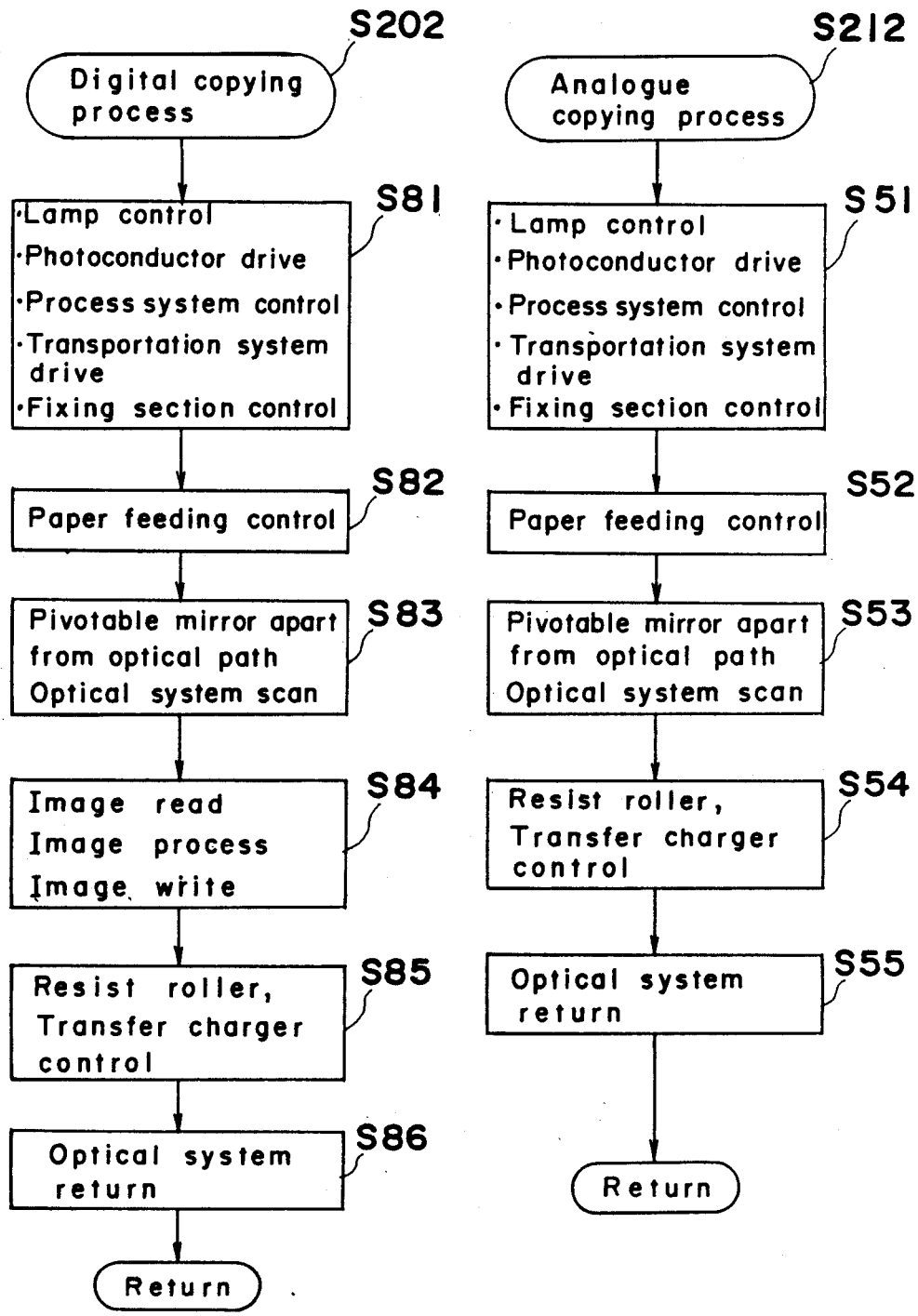

IMAGE PROCESSING APPARATUS OPERABLE IN PLURAL OPERATION MODES

BACKGROUND OF THE INVENTION

1. Filed of the Invention

The present invention relates to an image processing apparatus operable in plural operation modes, and more particularly, to an image processing apparatus operable in plural operation modes having priority orders such as an electrophotographic copying machine comprising analogue and digital copying modes.

2. Description of Related Art

Conventionally, as electrophotographic copying machines, there have been provided an analogue copying machine for forming a latent image on a photoconductor and developing the latent image into a visible toner image so as to print an so-called analogue image on a sheet of copying paper, and a digital copying machine for printing dot images or so-called digital image on a sheet of copying paper according to digital image data.

In the digital copying machine, after an image of a document (referred to as a document image hereinafter) is read and converted into analogue electric signals by an image sensor, the analogue electric signals are converted into digital image data by an analogue to digital converter. Further, an exposure head such as an LED head forms dot images on a photoconductive drum according to the digital image data so as to form an electrostatic latent image thereon. Thereafter, in the manner well known to those skilled in the art, the electrostatic latent image is developed into a visible toner image with toner, and the toner image is transferred onto a sheet of copying paper.

The digital copying machine has such advantages that not only editing operation such as trimming operation can be performed since digital image data can be processed by a digital electric circuit but also digital image data can be stored in a storage unit and can be sent to an external unit.

On the other hand, the digital copying machine has such disadvantages that it is difficult not only to reproduce a half tone image but also to obtain a resolution higher than a predetermined resolution. In order to reproduce a half tone image, the dither matrix method is used generally. However, in this method, the resolution of the reproduced half tone image becomes low, resulting in degradation in the quality of the reproduced binary image such as character image or the like. Further, in order to heighten the resolution of the reproduced image, it is necessary to process a large amount of data for representing an image. Therefore, the digital copying machine requires not only a storage unit having a large memory capacity but also a longer processing time. Furthermore, when an image which has copied by a digital copying machine is recopied by a digital copying machine, in many cases, degradation in the quality of the recopied image is caused due to the moire phenomenon. Furthermore, when a half tone image which has copied by a digital copying machine is recopied by a digital copying machine, there is caused remarkable degradation in the quality of the recopied image which is produced by a so-called generation copying operation. Therefore, it is necessary to utilize either an analogue copying machine or a digital copying machine depending on the use for copying an image and/or a document.

In order to solve the aforementioned problems of the conventional digital copying machine, there are proposed a method for reproducing both of a binary image and a half tone image by processing image data so as to obtain a predetermined resolution, a method for performing the generation copying operation by reducing the moire phenomenon using a filtering method, and a method for reading an image with use of an image reader having a higher resolution and for writing the read image in a high density so as to reproduce an image in a higher quality on a sheet of copying paper. However, in all the methods, the composition of the copying machine becomes complicated, resulting in increase in the manufacturing cost and decrease in the processing speed thereof.

On the other hand, documents which are copied in offices are binary information such as characters, numerals, line drawings, and also it is necessary to often produce a hard copy of image data of an half tone image. Therefore, the analogue copying machine has higher performance in works in offices than the digital copying machine, generally.

In order to perform various kinds of copying operation, there has been proposed a copying machine of composite type comprising an analogue copying system and a digital copying system. In the copying machine of this type, the analogue and digital copying systems utilize a common electrophotographic printing section. However, the analogue copying system utilizes an exposure optical system for projecting light reflected from a document onto a photoconductor. On the other hand, the digital copying system utilizes an image read section using a CCD image sensor or the like, and an image write section such as laser printer or the like. Either the analogue copying system or the digital copying system of the copying machine of composite type can be used depending on the use so as to make the best use of the features of each copying system. For example, when a copy which has been produced by the digital copying system is recopied, degradation in the quality of the image can be reduced by reproducing the copy using the analogue copying system. Furthermore, an analogue half tone image and a digital binary image can be composed by the copying machine of composite type.

Generally, the copying machine of composite type comprises an image read mode for reading an image using a CCD image sensor which is used in a digital copying mode, and an image write mode for writing an image using an image write head such as an LED head, in addition to an analogue copying mode and the digital copying mode.

Respective processes of the analogue copying mode and the digital copying mode can be executed independent of the other apparatuses by the operator's operation. Further, in the process of the image read mode, the copying machine of this type is connected to an external unit such as a personal computer, and image data which have been read by the CCD image sensor are outputted thereto. In this case, the copying machine can be operated using an operation panel arranged on the external unit, however, it is necessary to arrange the external unit adjacently to the copying machine of composite type.

Furthermore, in the process of the image write mode, the copying machine of composite type may be connected to an external unit such as a personal computer, or the copying machine of composite type may be used as a facsimile by adding a telecommunication control section thereto. The latter operation mode is referred to as a facsimile mode hereinafter. In the facsimile mode, the copying machine of composite type is operable by a remote control through a telecommunication line.

Upon executing the process of the facsimile mode, when the process of either the analogue copying mode or the digital copying mode is in execution, image data sent from a transmitter can not be received. Therefore, not only the transmitter must wait without any operation but also the telecommunication line is occupied uselessly. Furthermore, processes of a personal computer which is connected to the transmitter are suspended, resulting in possibility of decrease in the working efficiency thereof.

In order to solve the aforementioned problems, there is provided a storage unit having a large memory capacity. In this case, image data sent from the transmitter are received and stored temporarily in the storage unit, and the image data can be printed on a sheet of copying paper after the copying operation is completed. However, the cost of the copying machine comprising the storage unit having a large memory capacity increases remarkably.

In the conventional copying machine of composite type, the process of the image read mode can be executed whether or not the process of the image write mode is in execution, however, the process of the image read mode can not be executed simultaneously when the process of either the analogue copying mode or the digital copying mode is in execution. Thus, among the processes of these modes of the copying machine of composite type, there are not only the process of a mode which should be executed by priority to the processes of the other modes but also the processes of the modes which can not be executed simultaneously.

SUMMARY OF THE INVENTION

An essential object of the present invention is to provide an image processing apparatus operable in plural operation modes having priority orders, which is capable of performing image forming operation efficiently.

Another object of the present invention is to provide an image processing apparatus operable in plural operation modes, which is capable of executing a process of an operation mode for driving an exposure head to form dot images on a photoconductor responsive to electric signals sent from an external unit so as to form an electrostatic latent image thereon, by priority to the processes of the other operation modes.

A further object of the present invention is to provide an image processing apparatus operable in plural operation modes, which is capable of simultaneously executing both of a process of an operation mode for driving an exposure head to form dot images on a photoconductor responsive to electric signals sent from an external unit so as to form an electrostatic latent image thereon, and another mode for enabling a transmitter to transmit electric signals outputted from the image sensor, to an external unit.

In order to accomplish the aforementioned objects, according to one aspect of the present invention, there is provided an image processing apparatus comprising:

an image sensor for reading an image of a document set on a document table and for outputting electric signals corresponding to the image of the document;

a photoconductor;

optical means for forming an image reflected from a document set on said document table onto said photoconductor;

receipt means for receiving electric signals sent from an external unit;

an exposure head for forming dot images on said photoconductor responsive to the electric signals sent from either of said image sensor and said receipt means;

mode selection means for selecting at least one or plural operation modes of said image processing apparatus and for outputting a mode selection signal representing the selected one or plural operation modes, the operation modes including: a first operation mode for driving said exposure head to form dot images on said photoconductor responsive to the electric signals sent from said receipt means so as to form an electrostatic latent image thereon, a second operation mode for driving said exposure head to form dot images on said photoconductor responsive to the electric signals sent from said image sensor so as to form an electrostatic latent image thereon, and a third operation mode for enabling said optical means to form an image reflected from a document set on said document table onto said photoconductor so as to form an electrostatic latent image thereon; and control means for executing the processes of the selected one or plural operation modes responsive to the mode selection signal, said control means executing the process of the first operation mode by priority to the other operation modes when plural operation modes including the first operation mode are selected by said mode selection means.

According to another aspect of the present invention, there is provided an image processing apparatus comprising:

an image sensor for reading an image of a document set on a document table and for outputting electric signals corresponding to the image of the document;

transmission means for transmitting the electric signals outputted from said image sensor, to an external unit;

a photoconductor;

optical means for forming an image reflected from a document set on said document table onto said photoconductor;

receipt mean for receiving electric signals sent from an external unit;

an exposure head for forming dot images on said photoconductor responsive to the electric signals sent from either of said image sensor and said receipt means;

mode selection means for selecting at least one or plural operation modes of said image processing apparatus and for outputting a mode selection signal representing the selected one or plural operation modes, the operation modes including: a first operation mode for driving said exposure head to form dot images on said photoconductor responsive to the electric signals sent from said receipt means so as to form an electrostatic latent image thereon, a second operation mode for driving said exposure head to form dot images on said photoconductor responsive to the electric signals sent from said image sensor so as to form an electrostatic latent image thereon, a third operation mode for enabling said optical means to form an image reflected from a document set on said document table onto said photoconductor so as to form an electrostatic latent image thereon, and a fourth operation mode for enabling said transmission means to transmit electric signals outputted from said image sensor, to an external unit; and control means for executing the processes of the selected one or plural operation modes responsive to the mode selection signal, said control means executing the processes of the first operation mode and the fourth operation mode simultaneously when both the first operation mode and the fourth operation mode are selected by said mode selection means.

BRIEF DESCRIPTION OF THE DRAWINGS

These and other objects and features of the present invention will become clear from the following description taken in conjunction with the preferred embodiment thereof with reference to the accompanying drawings, in which:

FIGS. 2a and 2b are perspective views showing a developing unit arranged in the electrophotographic copying machine shown in FIG. 1, and photointerrupter switches, each of which is arranged so as to oppose to each developing unit;

FIG. 3 is a perspective view showing a resist roller arranged in the electrophotographic copying machine shown in FIG. 1, and peripheral units thereof;

FIG. 14 is a flowchart showing a digital copying process shown in FIG. 11d; and

FIG. 15 is a flowchart showing an analogue copying process shown in FIG. 11d.

DETAILED DESCRIPTION OF THE PREFERRED EMBODIMENT

An electrophotographic copying machine of composite type of a preferred embodiment according to the present invention will be described below in the order of the following items, with reference to attached drawings.

(a) Composition of copying machine (b) Analogue copying mode (c) Digital copying mode, image read mode and image write mode (d) Resist control (e) Composition of control system (f) Control flow of control system The electrophotographic copying machine of composite type comprises five operation modes as described in detail later, and is characterized in a mode selection control executed using flags shown in Tables 1, 2 and 3 which is described in the chapter (f) with reference to FIGS. 11a to 11d.

(a) Composition of copying machine

Figure 1:
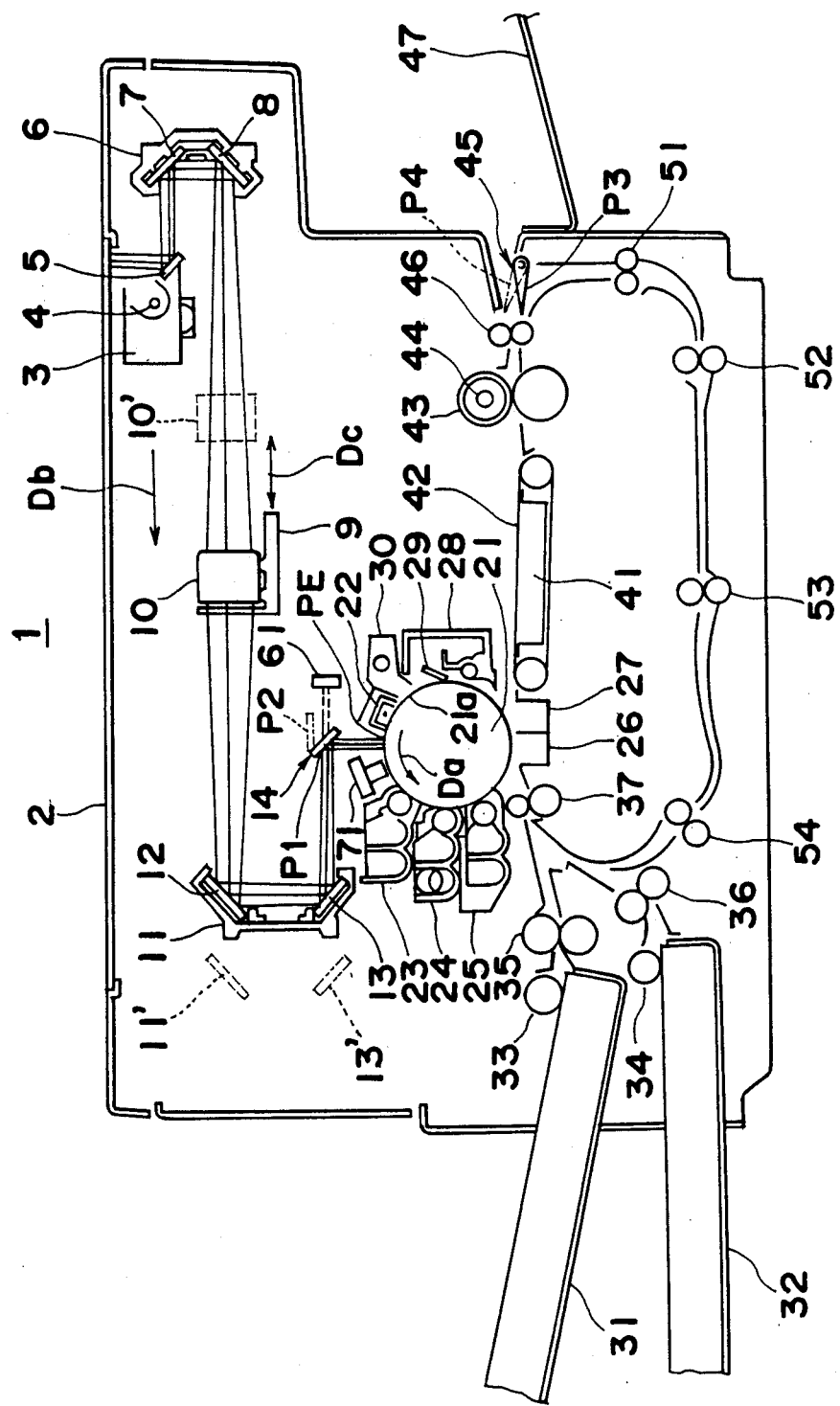
FIG. 1 is a schematic side view showing a composition of an electrophotographic copying machine of composite type of a preferred embodiment according to the present invention.

FIG. 1 shows the composition of the electrophotographic copying machine 1 of the preferred embodiment according to the present invention.

Referring to FIG. 1, the electrophotographic copying machine 1 mainly comprises a pivotable reflection mirror 14 which is arranged at the most nearest position to a photoconductive drum 21 among plural reflection mirrors constituting an optical system, a line type CCD image sensor 61 for reading an image, and an LED head 71 for writing an image and peripheral circuits thereof, in addition to a conventional analogue electrophotographic copying machine, wherein the pivotable mirror 14 can be rotated and the position thereof is switched over between either a first position P1 or a second position P2, as described later.

The electrophotographic copying machine 1 comprises an analogue copying mode, a digital copying mode, an image read mode for reading an image using the CCD image sensor 61, an image write mode for writing an image on the photoconductive drum 21 using the LED head 71, and an image write remote mode for writing an image on the photoconductive drum 21 using the LED head 71 according to data sent from an external unit. The electrophotographic copying machine 1 can be used as a facsimile after a telecommunication control section for transmitting image information through a telephone line and for receiving image information therethrough is added thereto.

One of the points different from the conventional copying machine is that the electrophotographic copying machine 1 comprises the CCD image sensor 61 and the LED head 71 which are used in the digital copying mode, in addition to a scan optical system for scanning light reflected from a document which is used in the analogue copying mode.

In the analogue copying mode, the position of the pivotable mirror 14 is switched over so as to be located at the first position P1. Then, a document set on an optically transparent glass document table 2 is illuminated by an illumination lamp 4 arranged within an illumination unit 3. After light reflected from the document passes through the scan optical system constituted by a reflection mirror 5 mounted on the illumination unit 3, reflection mirrors 7 and 8 mounted on a mirror unit 6, a scan lens 10 mounted on a lens support 9, reflection mirrors 12 and 13 mounted on a mirror unit 11, and the pivotable mirror 14, the light is incident onto a photoconductive layer 21a of the photoconductive drum 21 so as to form a document image thereon. It is to be noted that an exposure point on the photoconductive layer 21a is indicated by a reference PE in FIG. 1.

On the other hand, in the digital copying mode or the image read mode, among an optical system for enabling light reflected from the document to transmit from the document to the image sensor 61, there is used a partial of the optical system for enabling the reflected light to transmit to the pivotable mirror 14 in common with that used in the analogue copying mode, and the image sensor 61 is arranged at a position optically equivalent to the exposure point PE on the photoconductive layer 21a of the photoconductive drum 21. In the digital copying mode or the image read mode, the pivotable mirror 14 is rotated so that the position thereof is located at the second position P2, resulting in that the pivotable mirror 14 is apart from the optical path. Then, the light reflected from the reflection mirror 13 reaches the image sensor 61 without obstruction of the pivotable mirror 14. Since the optical path upon reading an image in the digital copying mode is almost common to that in the analogue copying mode, the composition of the electrophotographic copying machine 1 becomes simple.

Another of the points different from the conventional analogue copying machine is not only to switch over the polarity of the voltage for transferring a toner image to be applied to a transfer charger 26 between positive and negative but also to provide plural developing units 23, 24 and 25 containing toner having polarities different from each other. Namely, in the analogue copying mode, a normal developing operation is performed. On the other hand, in the digital copying mode or the image write mode, a reverse developing operation is performed.

Around the photoconductive drum 21 which is rotated in the counterclockwise direction as indicated by an arrow Da, there are provided a corona charger 22, the developing units 23, 24 and 25, the transfer charger 26, a cleaning unit 28 and an eraser lamp 30, in the manner similar to that of the conventional electrophotographic copying machine.

After an electrostatic latent image is formed on the photoconductive layer 21a of the photoconductive drum 21 which has been electrified uniformly with a negative electric potential by the corona charger 22, the electrostatic latent image is developed into a visible toner image by one of the developing units 23, 24 and 25. Thereafter, the toner image is transferred onto a sheet of copying paper by the transfer charger 26. The toner remaining on the photoconductive layer 21a of the photoconductive drum 21 is removed by the cleaning unit 28, and then, the photoconductive layer 21a is discharged by illuminating the surface thereof using the eraser lamp 30. On the other hand, the toner image formed on a sheet of copying paper is fixed by a fixing roller 43, and is discharged to a paper discharging tray 47.

In this process of the analogue copying mode, since the light reflected from the document is scanned in such a state that the photoconductive layer 21a of the photoconductive drum 21 is electrified uniformly with a negative electric potential, an electrostatic latent image is formed on a portion of the photoconductive layer 21a where the charge remains. In this case, when the electrostatic latent image is developed into a visible toner image in the normal developing operation by the developing unit 23 or 25 containing toner having positive electric potential, and the toner image having positive electric potential is formed on the photoconductive layer 21a of the photoconductive drum 21. Then, when a negative voltage is applied to the transfer charger 26, the toner image is transferred onto a sheet of copying paper.

On the other hand, in the digital copying mode or the image write mode, the LED head 71 is turned on so as to emit above an image portion of the photoconductive layer 21a of the photoconductive drum 21 which has been electrified uniformly with a negative electric potential in order to shorten a time interval upon supplying the power to the LED head 71 so as to make a life of the LED head 71 longer. Then, the charge of the image portion disappears therefrom, and the electrostatic latent image is formed thereon. Thereafter, when the electrostatic latent image is developed in the reverse developing operation by the developing unit 24 containing toner having negative electric potential, a visible toner image having the negative electric potential is formed on the image portion where the charge has disappeared. Thereafter, when a positive voltage is applied to the transfer charger 26, the toner image is transferred onto a sheet of copying paper.

It is to be noted that, the LED head 71 used in the digital copying mode or the image write mode is arranged between the corona charger 22 and the developing unit 23.

In the present preferred embodiment, a sheet of copying paper is fed from one of paper feeding cassettes 31 and 32 through a resist roller 37 to a transfer section comprising the transfer charger 26.

Furthermore, there is provided a paper refeeding system comprising a pivotable gating nail member 45 and transportation rollers 51 to 54, so that a sheet of copying paper on which a toner image is fixed is transported to the resist roller 37, again. Therefore, there can be performed such a composite copying process that information such as date is printed in the digital copying mode on a sheet of copying paper on which an analogue image has been printed thereon in the analogue copying mode. Since an analogue image and a digital image can be composed so as to print the composite image thereof on a sheet of copying paper, the electrophotographic copying machine 1 can be applied to a wider range of application.

In the present preferred embodiment, the optical path in the digital copying mode and the optical path in the analogue copying mode are switched over by using the pivotable mirror 14. However, an optically semitransparent mirror may be used in place of the pivotable mirror 14. In this case, since the semitransparent mirror is mounted fixedly, it is not necessary to provide the movable portion thereof. In the analogue copying mode, one portion of the light reflected from the document is reflected by the semitransparent mirror, and then, the light is incident onto the photoconductive layer 21a of the photoconductive drum 21. On the other hand, in the digital copying mode, when the light reflected from the document is incident onto the semitransparent mirror, the light passes therethrough, and then, the light is incident onto the CCD image sensor 61 and is detected by the CCD image sensor 61. In the image write operation of the digital copying mode, since it is necessary to expose the photoconductive drum 21 to light in such a state that the exposure light is not incident thereto from the semitransparent mirror, the image read operation and the image write operation are performed so that a timing of the image read operation is suitably shifted from a timing of the image write operation.

(b) Analogue copying mode

The operation of the analogue copying mode and respective sections of the electrophotographic copying machine 1 will be described below.

In FIG. 1, the illumination unit 3 and the mirror unit 6 are located at a home position. Upon copying a document image in the analogue copying mode or upon reading an image using the image sensor 61, the illumination unit 3 and the mirror unit 6 of the optical system are moved in the left direction as indicated by an arrow Db at a predetermined speed by a mechanism (not shown) including a driving motor which is well known to those skilled in the art so as to scan the document image in a slit form. Then, the illumination unit 3 and the mirror unit 6 are moved so that a ratio of the movement speed of the illumination unit 3 to the movement speed of the mirror unit 6 becomes two and the optical length between the surface of the document and the scan lens 10 is kept constant at all times.

In FIG. 1, there are shown the positions of respective units of the optical system when the document image is scanned at a magnification of one or in an equal magnification mode, namely, in such a state that a magnification of an electrostatic latent image formed on the photoconductive layer 21a of the photoconductive drum 21 to an actual document image of a document set on the document table 2 is set at one. In the equal magnification mode, the movement speed of the illumination unit 3 and the rotation speed of the photoconductive drum 21 are adjusted so that they are substantially equal to each other.

The lens support 9 for mounting the scan lens 10 is moved in the left and right directions as indicated by arrows Dc in FIG. 1 by a mechanism (not shown) well known to those skilled in the art, so that the magnification can be changed.

When the magnification is set at two, the scan lens 10 is moved to a position as indicated by a numerical reference 10'. Then, in order to set the surface of the photoconductive layer 21a to a focal plane so as to correct the correction conjugate length of the optical path, the mirror unit 11 is moved so that the mirrors 12 and 13 are located at respective positions as indicated by numerical references 12' and 13'. Furthermore, since the rotation speed of the photoconductive drum 21 is set at a predetermined constant speed independent of the magnification, the movement speed of the illumination unit 3 is adjusted so as to be half the speed at the equal magnification.

It is to be noted that, in the present preferred embodiment, the photoconductive layer 21a of an organic photoconductor (OPC) is formed on the photoconductive drum 21 of aluminum, and the photoconductive layer 21a is electrified with a positive electric potential by the corona charger 22.

When the scanned document image is formed on the electrified photoconductive layer 21a, the charge having a negative electric potential on the photoconductive layer 21a disappears according to the intensity of the light reflected from the document. Namely, the charge corresponding to a bright portion of the document disappears from the photoconductive layer 21a and the charge corresponding to a dark portion thereof remains thereon, so that an electrostatic latent image corresponding to the document image is formed thereon.

As described above, around the photoconductive drum 21, there are arranged the developing units 23, 24 and 25 for developing an electrostatic latent image into a visible image with toner. In the developing units 23, 24 and 25, respective colors of toner used as developer and respective electrifying characteristics are set so that they are different from each other. In the present preferred embodiment, the developing unit 23 contains red color toner having a positive electric potential, the developing unit 24 contains black color toner having a negative electric potential, and the developing unit 25 contains black toner having a positive electric potential.

On the developing unit 24 containing the toner having the negative electric potential, a projection 91 is formed as shown in FIG. 2. When the developing unit 24 is mounted at a predetermined position in the electrophotographic copying machine 1, a photointerrupter switch 93 is turned on. Further, on each of the developing units 23 and 25 containing the toner having the positive electric potential, a projection 92 is formed at a position as indicated by a dotted line shown in FIG. 2. When each of the developing units 23 and 25 is mounted at the predetermined position in the electrophotographic copying machine 1, a photointerrupter switch 94 is turned on. Therefore, the polarity of the toner contained in each developing unit can be judged based on the switching state of each of the photointerrupter switches 93 and 94.

Figure 10:
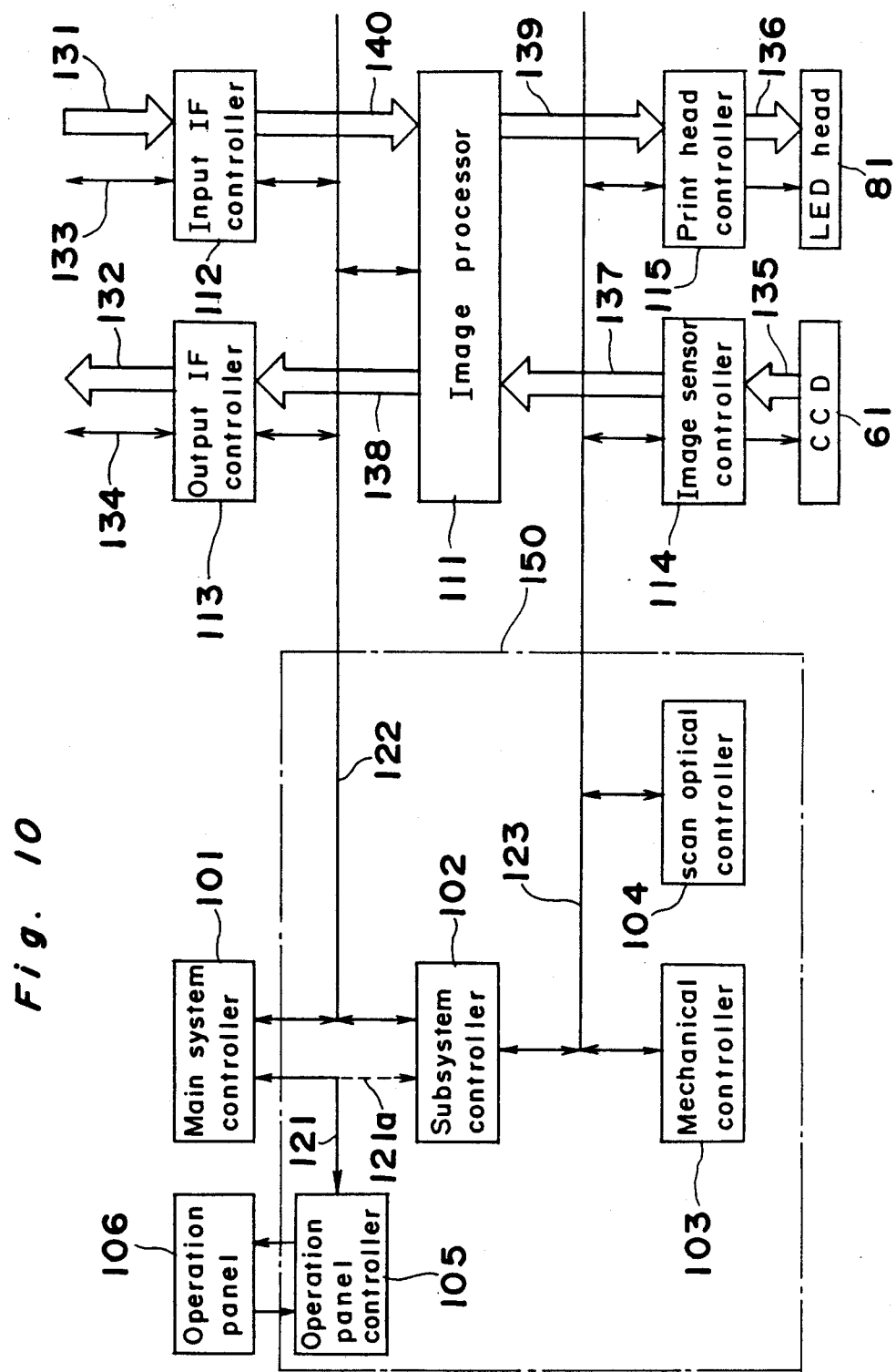
FIG. 10 is a schematic block diagram showing a control system of the electrophotographic copying machine shown in FIG. 1.

Responsive to an instruction entered using an operation panel 106 shown in FIG. 10, only one of these developing units 23, 24 and 25 is enabled to develop, and the other are disabled.

When the developing unit 25 is selected in the analogue copying mode, a portion of an electrostatic latent image formed on the photoconductive layer 21a which has been electrified with a negative electric potential is developed with black color toner having the positive electric potential into a visible toner image corresponding to a document image. Similarly, when the developing unit 23 is selected, an electrostatic latent image is developed into a visible toner image with red color toner having the positive electric potential. On the other hand, when the developing unit 24 is selected in the digital copying mode, a negative/positive reversed image is formed on the photoconductive layer 21a.

On the other hand, paper feeding cassettes 31 and 32, on which copying papers are set, are detachably mounted onto the electrophotographic copying machine 1, and only one of the paper feeding cassettes 31 and 32 is selected. When the paper feeding cassette 31 is selected, a sheet of copying paper is picked up from the paper feeding cassette 31 by a pick up roller 33 which is driven responsive to a control signal generated at a predetermined timing, and is transported toward a resist roller 37 by a transportation roller 35. Thereafter, a sheet of copying paper is stopped at the resist roller 37 in such a state that the edge thereof reaches the resist roller 37. On the other hand, when the paper feeding cassette 32 is selected, a sheet of copying paper is picked up therefrom by a pick up roller 34, and is transported toward the resist roller 37 by a transportation roller 36. Thereafter, a sheet of copying paper is stopped at the resist roller 37 in such a state that the edge thereof reaches the resist roller 37.

As shown in FIG. 3, the resist roller 37 is connected to a driving motor (not shown) through a magnetic clutch 38 and a chain 39. A sheet of copying paper 40 transported from one of the paper feeding cassettes 31 and 32 waits in such a state that a sheet of copying paper 40 runs against the resist roller 37 stopped.

When the edge of the visible toner image developed by one of the developing units 23, 24 and 25 reaches a predetermined position, the resist roller 37 is driven by a control system described in detail later, and then, a sheet of copying paper 40 starts to run.

When a sheet of copying paper 40 is in contact with the photoconductive layer 21a of the photoconductive drum 21, the charge having an electric potential of a polarity opposite to that of toner is given to a sheet of copying paper 40 from the back side thereof by the transfer charger 26, so that not only a sheet of copying paper 40 is stuck closely to the photoconductive layer 21a but also the toner image formed on the photoconductive layer 21a is transferred onto a sheet of copying paper 40. Thereafter, a sheet of copying paper 40 is separated by a separating charger 27 to which an alternating-current high voltage is applied.

Almost the toner adhering on the photoconductive layer 21a is transferred onto a sheet of copying paper 40, however, a small amount of toner is not transferred thereonto, and then, the toner remains on the photoconductive layer 21a. After the residual toner is scraped off by a cleaning blade 29 arranged in a cleaning unit 28, it is collected into a waste toner bottle (not shown). Since some charge remains on the photoconductive layer 21a in such a state, the whole surface of the photoconductive layer 21a is exposed to light by an eraser lamp 30, and then, the photoconductive layer 21a becomes the initial state with no charge.

A sheet of copying paper having been separated from the photoconductive drum 21 is sucked by a suction unit 41 and is transported to a fixing roller 43 by a transportation belt 42.

A heating lamp 44 is arranged within a fixing roller 43, and the temperature of the surface of the fixing roller 43 is kept constant so as to melt toner adhering on a sheet of copying paper. When a sheet of copying paper passes through the fixing roller 43, the toner image adhering to thereon is fixed, and then, a sheet of copying paper is discharged to the paper discharging tray 47 by the discharging roller 46 when the pivotable gating nail member 45 is located at a position P3 as indicated by a real line in FIG. 1.

On the other hand, in a mode for printing an image of image data sent from an external unit such as a host computer onto a sheet of copying paper on which a document image has been printed in order to print a composite image composed of a document image and an image of image data thereon, the pivotable gating nail member 45 is rotated so as to be located at a position P4 as indicated by a dotted line in FIG. 1. At that time, a sheet of copying paper on which the document image is printed has been transported sequentially by respective transportation rollers 51 to 54, and then, a sheet of copying paper reaches the resist roller 37 again and waits for the next copying operation.

(c) Digital copying mode, image read mode and image write mode

Each operation of the digital copying mode, the image read mode, the image write mode and the image write remote mode will be described below.

In the analogue copying mode, the pivotable reflection mirror 14 is located at the position P1, and then, light reflected from the document is reflected by the reflection mirror 14 so as to project the light onto the exposure position PE on the photoconductive layer 21a of the photoconductive drum 21. On the other hand, upon reading a document image in the digital copying mode or the image read mode, the pivotable reflection mirror 14 is rotated so as to be located at the position P2. Then, the reflection mirror 14 is apart from the optical path of the light reflected from the document, and the document image is formed on the line type CCD image sensor 61.

Figure 4:
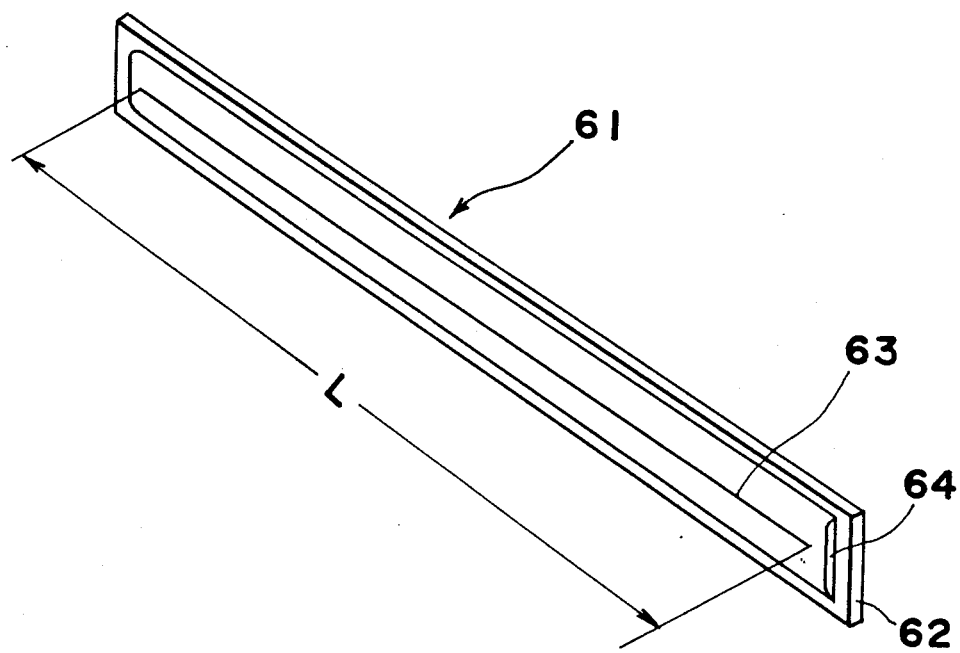
FIG. 4 is a perspective view showing a CCD image sensor mounted in the electrophotographic copying machine shown in FIG. 1.

As shown in FIG. 4, the image sensor 61 comprises 5000 photodetectors which are aligned in a arrangement density of 400/inch, wherein the length L of the photodetecting section composed of the photodetectors is about 12.5 inches.

In the equal magnification mode, the document image is digitalized in a resolution of 400 dots/inch. For example, when the scan lens 10 is located at the position as indicated by a dotted line 10' in FIG. 1, namely, when the magnification is set at two, the resolution thereof becomes 800 dots/inch.

FIG. 4 shows the CCD image sensor 61. As shown in FIG. 4, CCD devices 63 are mounted on a ceramic substrate 62, and a transparent protection glass 64 is bonded thereon so as to cover the CCD devices 63. In the present preferred embodiment, the CCD image sensor is used as an image sensor device, however, there my be used an amorphous silicon image sensor or a Cds image sensor.

As described above, the image sensor 61 is arranged at the position shown in FIG. 1 so that a distance between the scan lens 10 and the image sensor 61 is equal to a distance between the scan lens 10 and the image forming surface of the photoconductive layer 21a of the photoconductive drum 21. The optical system between the document and the reflection mirror 13 to be used in the analogue copying mode is used in these modes. Therefore, the resolution upon reading an image using the image sensor 61 can be altered using the same control system as that to be used upon altering the magnification in the analogue copying mode.

Figure 5:
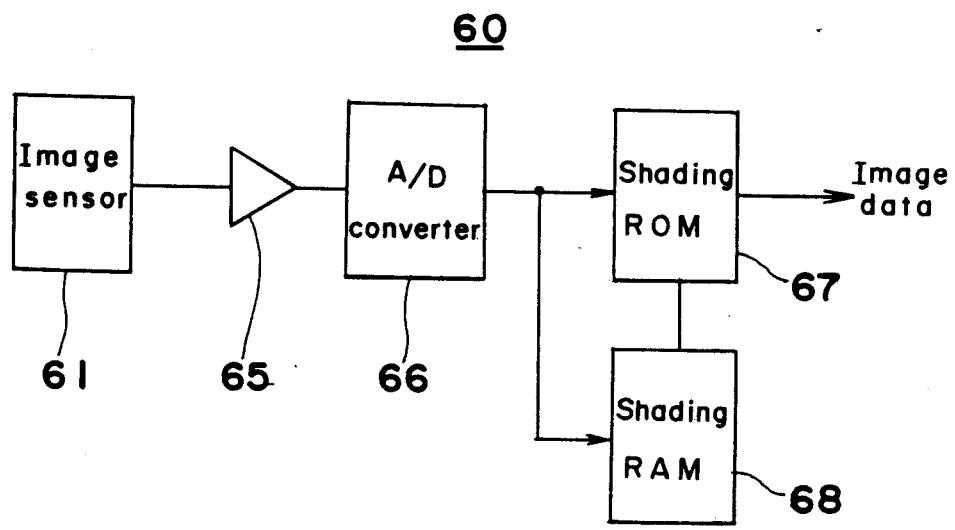
FIG. 5 is a schematic block diagram showing an image read circuit mounted in the electrophotographic copying machine shown in FIG. 1.

FIG. 5 shows an image read circuit 60.

Referring to FIG. 5, a document image is read and converted into analogue electric signals by the CCD image sensor 61, and the analogue electric signals are amplified by an amplifier 65. Thereafter, the amplified analogue electric signals are converted into digital image data by an analogue to digital converter (referred to as an A/D converter hereinafter) 66. In the present preferred embodiment, the converted image data are seven bits digital data having 128 levels in order to take decrease in the gradation due to a shading correction executed by the next step, into consideration.

In a conventional general image read system including the image read circuit 60 of the present preferred embodiment, even though a document image having a uniform density is read, the level of the digital image data outputted from the A/D converter 66 does not always become constant due to uniformity of the light amount of light radiated from the illumination lamp 4, decrease in the light amount of light passing through the outer edge of the scan lens 10, and dispersion of the sensitivity of each image sensor device.

In order to correct the dispersion produced in the optical image read system, there are provided a ROM 67 and a RAM 68 for the shading correction. Therefore, a shading in the level of the image data outputted from the A/D converter 66 is corrected by the ROM 67 and the RAM 68 in the manner well known to those skilled in the art, and then, the shading-corrected image data are outputted as read image data. A well known half tone process may be made for the shading-corrected image data by an image processor (not shown), or the shading-corrected image data may be outputted to an external unit through an interface section, if necessary. The description thereof is omitted therein since it is not the subject matter of the present invention.

Figure 6:
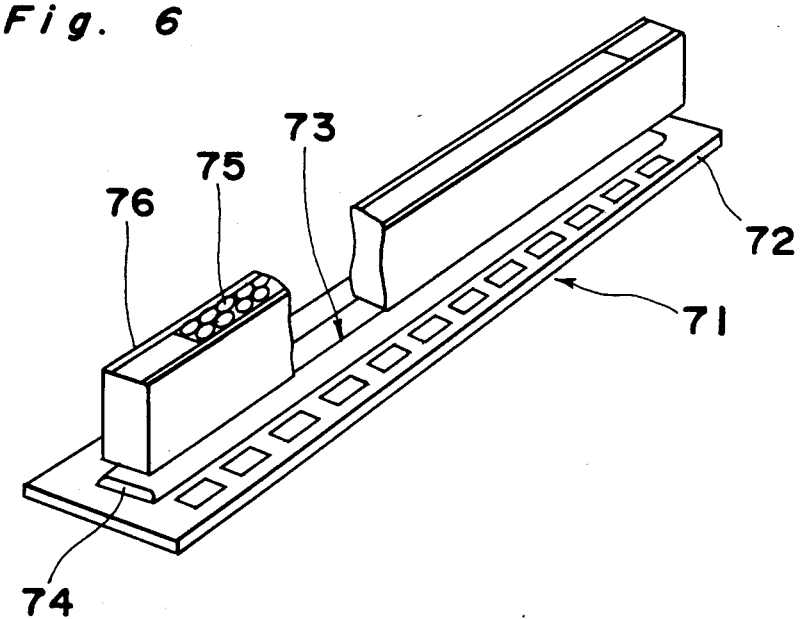
FIG. 6 is a perspective view showing an LED head mounted in the electrophotographic copying machine shown in FIG. 1.
Figure 7:
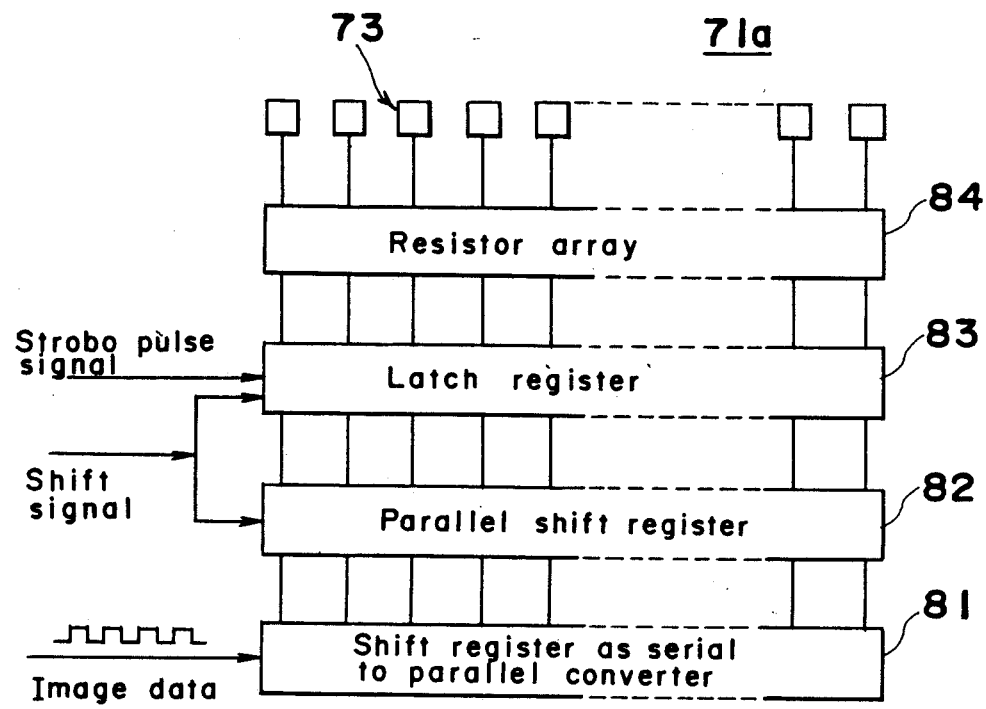
FIG. 7 is a schematic block diagram showing a driving circuit for driving the LED head shown in FIG. 6.

FIG. 6 shows the LED head 71 used as an exposure head for writing an image in the digital copying mode, the image write remote mode and the image write mode, and FIG. 7 shows a driving circuit 71a for driving the LED head 71.

In the LED head 71 shown in FIG. 6, an LED array 73 and electronic parts for constituting the driving circuit 71a shown in FIG. 7 are mounted on a ceramic substrate 72 on which a circuit pattern is printed. On the top surface of the LED array 73, an optically transparent protection glass 74 is bonded so as to cover the LED array 73, the driving circuit 71a and a wire boding section thereof (not shown), in order to protect them from an external environment. Above the protection glass 74, there is mounted a cell fox lens array 76 comprising plural rod lenses 75 in a cylindrical shape having a diameter of about 1 mm, and the cell fox lens array 76 scans LED light flickering according to the image data onto the photoconductive layer 21a so as to form bit images thereon. The ceramic substrate 72, on which the LED array 73 and the driving circuit 71a are mounted, and the cell fox lens array 76 are fixed by metallic parts (not shown) so that a distance between the cell fox lens array 76 and the LED array 73 becomes a predetermined distance. It is to be noted that, on a back surface of the ceramic substrate 72, an aluminum member for radiating heat generated in the LED array 73 is mounted.

Referring to FIG. 7, the driving circuit 71a for driving the LED head 71 comprises a shift register 81 as serial to parallel converter for converting serial image data of one line into parallel image data, a parallel shift register 82 for receiving the parallel image data outputted from the shift register 81 and for storing them temporarily, and a latch register 83 for latching the parallel image data outputted from the parallel shift register 82 and for outputting them for an output time interval indicated by a strobe pulse signal. The driving circuit 71a further comprises a resistor array 84 for limiting the current flowing into the switching devices and the LEDs which is connected to the LED array by a wire bonding method.

The action of the driving circuit 71a will be described below.

After serial image data of a first line are input to the shift register 81 as serial to parallel converter in synchronous to an image clock signal, serial image data are converted into parallel image data by the shift register 81 and then, responsive to a shift signal which is a horizontal synchronizing signal, the converted parallel image data are input to the parallel shift register 82, and also serial image data of a second line are input to the shift register 81. Responsive to the next shift signal, the parallel image data of the first line stored in the parallel shift register 82 are input to and are latched in the latch register 83. Also, the parallel image data of the second line are input to and are stored in the parallel shift register 82, and serial image data of a third line are input to the shift register 81.

When the strobe pulse signal having a pulse width of a time interval for lighting the LEDs is input to the latch register 83, respective LEDs of the LED array 73 are switched over according to the image data outputted from the latch register 83.

Thus, lighting operation of the LED array 73 is controlled according to the image data every one line, and bit images of one line are formed on the photoconductive layer 21a of the photoconductive drum 21.

(d) Resist control

There will be described below, control timings for a resist control for controlling the resist roller 37 upon transferring an electrostatic latent image formed on the photoconductive layer 21a onto a predetermined position of a sheet of copying paper.

Since the data writing method and the exposure position PE in the analogue copying mode are different from those in the digital copying mode and the image write mode, control timings for the resist control upon transferring an electrostatic latent image formed on the photoconductive layer 21a onto a predetermined position of a sheet of copying paper in the analogue copying mode is different from those in the digital copying mode and the image write mode.

Figure 8:
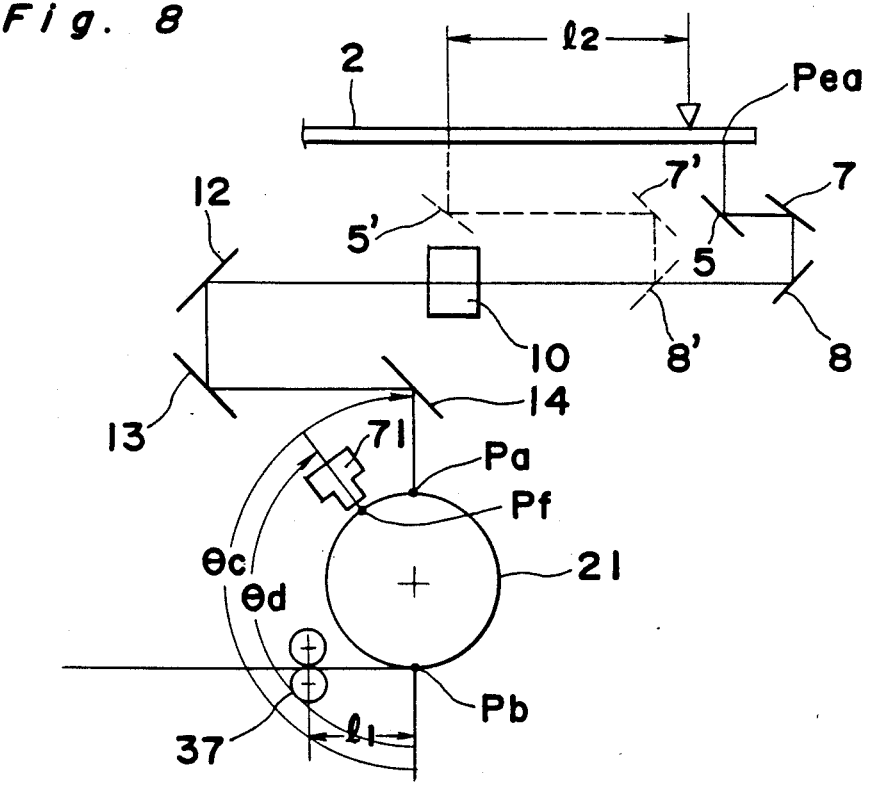
FIG. 8 is a schematic side view showing a partial portion of the electrophotographic copying machine shown in FIG. 1 for explaining operation timings of a resist control for controlling a resist roller shown in FIG. 1.
Figure 9:
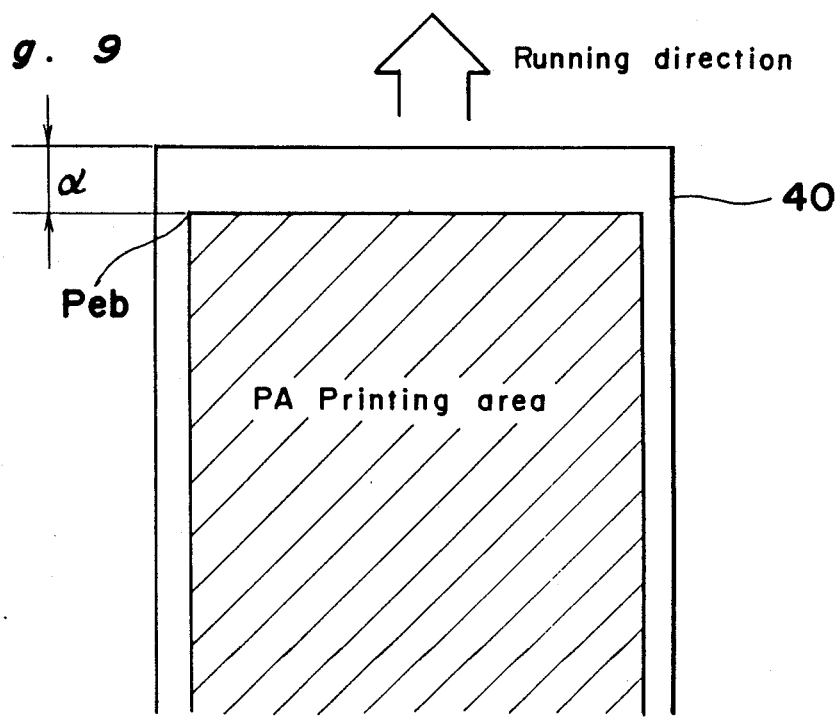
FIG. 9 is a plan view showing a printing area on a sheet of copying paper for defining a distance $a$.

In the case of the resist control in the analogue copying mode shown in FIG. 15, a timer value to be set in a timer counter corresponding to a time interval for driving the clutch 38 for the resist roller 37 shown in FIG. 3 is set at such a value that an edge of an electrostatic latent image formed on the photoconductive layer 21a corresponding to an edge Pea of a document image coincides with an edge Peb of a printing area PA on a sheet of copying paper shown in FIG. 9 when the edge of the electrostatic latent image thereof is rotated from the exposure position Pa to the transfer position Pb. Namely, the timer value is determined so that the timer counter has counted up to a precalculated timer value when the edge of the electrostatic latent image corresponding to the edge Pea of the document image is moved by rotation of the photoconductive drum 21 from the exposure position Pa by a difference $(lc - l_1)$ between a distance lc corresponding to an angle $\theta c$ shown in FIG. 8 and a distance $l_1$ between the resist roller 37 and the transfer position Pb. Concretely, the timer counter is started responsive to a starting signal outputted from a timer starting switch (not shown) which is turned on when the illumination unit 3 starts to move, and the timer counter counts a clock pulse which is outputted in synchronous with the movement of the illumination unit 3.

Since the movement distance of the illumination unit 3 while the edge of the electrostatic latent image corresponding to the document image moves by a distance $(lc - l_1)$, namely, a distance while the exposure point on the document moves for a time interval between a timing of the turning on point Pea of the timer starting switch and a timing for starting the resist roller 37 varies depending on the magnification, a timer value corresponding to the magnification is calculated.

When the timer counter has counted up to the precalculated timer value, the clutch 38 is driven so that a sheet of copying paper 40 is transported by the resist roller 37. In this case, since a timing when a sheet of copying paper 40 reaches the transfer position Pb coincides with a timing when the edge of the image reaches the transfer position Pb, the edge of the toner image formed on the photoconductive layer 21a coincides with the edge Peb of the printing area PA to be printed on a sheet of copying paper 40.

In the the present preferred embodiment, as described above, since the timer counter counts the clock pulse outputted in synchronous with the movement of the illumination unit 3, it is necessary to calculate the timer value depending on the magnification. In the case that there is used an apparatus wherein a timer counter is started at a timing when the edge of the document starts to be exposed to light and counts a clock pulse outputted in synchronous with the rotation of the photoconductive drum 21, it is not necessary to correct the timer value according to the magnification. In this case, since the rotation speed of the photoconductive drum 21 is constant, it is necessary to correct the timer value only in order to substantially cancel a dispersion of the arranging position of the timer start switch and a dispersion of the arranging position of the timing controller 37.

On the other hand, in the digital copying mode shown in FIG. 14, as described in detail later, another timer other than the timer used in the analogue copying mode starts to count the number. Thereafter, when another timer counts up to a predetermined time, the clutch 38 for the resist roller 37 is driven, and a sheet of paper is transported by the resist roller 37.

In this case, another timer is previously set at such a predetermined time that it counts up at a timing when the edge of the image printed on a sheet of paper 40 moves by a distance $(ld - l_1 - \alpha)$ from the point Pf, wherein a distance ld o the photoconductive drum 21 is a distance between the printing point Pf on the photoconductive drum 21, at which the LED head 71 prints dot images, and the transfer point Pb at which the dot images are transferred onto a sheet of paper 40 and corresponds to an angle interval $\theta d$ shown in FIG. 8, and $\alpha$ is a top margin amount corresponding to a distance between the top edge of a sheet of paper 40 and the printing start point Peb or the top edge of the printing area PA, as shown in FIG. 9. It is to be noted that the timer value to be set in another timer is corrected in order to cancel a dispersion of the arranging position of the LED head 71 and a dispersion of the arranging position of the resist roller 37.

(e) Composition of control system

FIG. 10 shows a control system for controlling the electrophotographic copying machine 1 of the present preferred embodiment.

Referring to FIG. 10, a main system controller 101 comprising a CPU for controlling the whole of the electrophotographic copying machine 1 is connected to an operation panel controller 105 through a communication line 121, and also is connected to a subsystem controller 102, an image processor 111, an input interface controller (referred to as an input IF controller hereinafter) 112 and an output interface controller (referred to as an output IF controller hereinafter) 113 through a communication line 122.

The subsystem controller 102 is connected to a mechanical controllers 103, a scan optical system controller 104, an image sensor controller 114 and a print head controller 115 through a communication line 123. The subsystem controller 103 controls respective controllers 103, 104, 114 and 115 according to an instruction sent from the main system controller 101, and sends information of each operation state of respective controllers 103, 104, 114 and 115 to the main system controller 101.

The mechanical controller 103 controls the units arranged around the photoconductive drum 21 and the units for feeding or transporting a sheet of paper based on a program stored therein according to an instruction sent from the main system controller 101, and sends information of each operation state of respective devices to the subsystem controller 102. For example, each operation state of the photointerrupter switches 94, 93 and 94 arranged respectively so as to oppose to the developing units 23 to 25 is supervised by the mechanical controller 103, and the mechanical controller 103 sends information of each operation state of respective photointerrupter switches 94, 93 and 94 to the subsystem controller 102, and further to the main system controller 101 through the subsystem controller 102.

The scan optical system controller 104 controls the devices of the optical system according to an instruction sent from the subsystem controller 102, and sends information of each operation state of respective devices thereof to the subsystem controller 102. Concretely, the scan optical system controller 104 controls the turning on or off operation and the light amount of the illumination lamp 4, each scan operation of the illumination unit 3 and the mirror unit 6, each movement operation of the scan lens 10 and the mirror unit 11 according to the magnification, and also calculates the scan speed of the scan optical system.

The operation panel controller 105 sends information of each operation state of the switches arranged on an operation panel 106 including mode selection switches (not shown) for selecting one or plural operation modes, to the main system controller 101, and the operation panel controller 105 also controls lighting operation of various kinds of indicators arranged on the operation panel 106.

The image sensor controller 114 receives image data sent from the CCD image sensor 61 responsive to an instruction of the subsystem controller 102, and instructs the image processor 111 to execute a specified process.

The LED head controller 115 receives image data sent from the image processor 111 or the input IF controller 112 responsive to an instruction of the subsystem controller 102, and also instructs the LED head 71 to write dot images of the image data on the photoconductive layer 21a of the photoconductive drum 21. Furthermore, the LED head controller 115 performs negative/positive reverse operation, the calculation of the printing area PA corresponding to the size of the copying paper, the editing operation of image data based on the calculated printing area PA, according to the information sent from the subsystem controller 102.

The image processor 111 performs a half tone process based on a specific dither pattern for image data sent from the image sensor controller 114 responsive to an instruction sent from the main system controller 101, and also performs compression process for image data. Further, the image processor 111 outputs the processed image data to the output IF controller 113, and outputs them to the LED head controller 115 so as to write dot images of the image data on the photoconductive layer 21a in the digital copying mode. Furthermore, the image processor 111 performs a recover process for image data received from an external unit by the input IF controller 112.

The output IF controller 113 performs communication control operation with external units responsive to an instruction sent from the main system controller 101, and outputs the image data processed by the image processor 111 to the external units.

The input IF controller 112 performs communication control operation with external units responsive to an instruction sent from the main system controller 101, and receives image data sent from the external units, and then, sends the received image data to the image processor 111 in order to convert the received image data into dot image data in a data form which can be written on the photoconductive layer 21a by the LED head 71.

The communication lines 121 and 122 which are connected to the main system controller 101 are provided for transmitting control commands and status data therethrough. The communication line 123 which is connected to the subsystem controller 102 is provided for transmitting control timing signals in addition to control commands and status data therethrough.

Control signal lines 131 and 132 for transmitting and receiving control signals between the input and output IF controllers 112 and 113 and the external units are selected depending on the external units connected thereto, and also image signal lines 133 and 134 for transmitting and receiving image data between the input and output IF controllers 112 and 113 and the external units are selected depending on the external units connected thereto.

An image signal line 135 connected between the image sensor 61 and the image sensor controller 114 and an image signal line 136 connected between the print head 71 and the print head controller 115 are image signal lines for transmitting serial image data, and the other image signal lines 137 to 140 are image signal lines for transmitting eight bits data in a parallel form.

In FIG. 10, a control section for controlling the conventional analogue the electrophotographic copying machine is indicated by an alternate long and short dash line 150, and the control system of the present preferred embodiment utilizes this control section in order to constitute the electrophotographic copying machine 1. In the conventional electrophotographic analogue copying machine, the operation panel controller 105 is connected to the subsystem controller 102 through a control line 121a.

The main system controller 101 can controls composite printing operation, responsive to information of each operation state of the photointerrupter switches 93 and 94 and information of the operation entered using the operation panel 106 which is sent from the operation panel controller 105. In the composite printing operation, for example, an image of digital image data sent from an external unit such as a host computer is printed on a sheet of copying paper on which an analogue document image has been printed in the analogue copying mode. Namely, the LED head 71 writes dot images corresponding to the digital image data sent from the external unit so as to form an electrostatic latent image corresponding to the dot images on the photoconductive layer 21a of the photoconductive drum 21, and the electrostatic latent image is developed into a visible toner image in the manner as described above. When the resist roller clutch 38 is started, the visible toner image is transferred onto a sheet of copying paper.

(f) Control flow of control system

FIGS. 11a to 11d are flowcharts showing a main routine for selecting one or plural modes according to the present invention, which is executed by the main system controller 101.

As described above, in the electrophotographic copying machine 1 of the present preferred embodiment, there are provided five operation modes; the image write remote mode, the image write mode, the image read mode, the digital copying mode, and the analogue copying mode.

<Mode selection flags, mode set flags and mode start flags>

In this control process shown in FIG. 11a to 11d, in order to control mode selection operation, the following flags are used.
(b) mode selection flags N, O, P, Q and R
(c) mode set flags $M_i$ (i=1 to 5)
(d) mode start flags $T_i$ (i=1 to 5)
(d) mode start flags $T_i$ (i=1 to 5)

Table 1 shows the mode selection flags of respective modes to be set using the operation panel 106. Respective mode selection flags are set in the priority orders at step S102 shown in FIG. 11a, responsive to mode selection performed using the operation panel 106 by the operator.

As shown in the column of the setting condition of flags of Table 1, the mode selection flag R of the image write remote mode which is specified by command sent from the external unit can be set by priority to the other flags. Namely, even though the processes of one or plural operation modes other than the image write remote mode is in execution, the mode selection flag R can be set. Also, since the image read process and the image write process can be executed simultaneously, the mode selection flags P and Q thereof can be set simultaneously. Further, only one of the mode selection flags N, 0 and Q of the analogue copying mode, the digital copying mode and the image write mode can be set. Furthermore, only one of the mode selection flags N, O and P of the analogue copying mode, the digital copying mode and the image read mode can be set.

Table 2 shows a relationship among the mode set flags $M_i$ and the mode start flags $T_i$. The mode set flags $M_i$ are flags to be set depending on a setting state of the mode selection flags at steps S109 to S113 shown in FIG. 11a. The start flags $T_i$ are flags to be set upon starting the units in a unit starting process at step S123 shown in FIG. 11b after setting one or plural modes.

When the image write read remote mode is selected ($M_1 = 1$) by the command sent from the external unit, the mode start flag $T_1$ can be set unconditionally by priority to the other flags in order to give priority to a data receipt process for receiving data sent from the external unit.

Further, when the image read mode is selected ($M_3 = 1$), the mode start flag $T_3$ can be set unconditionally. Namely, the mode start flag $T_3$ can be set simultaneously in addition to one of the mode start flags $T_1$ and $T_2$, since the the image read process can be executed even though there is set the mode start flag of one of the image read remote mode and the image write mode.

Furthermore, when the image write mode is selected ($M_2 = 1$), the mode start flag $T_2$ can be set by priority to the analogue copying mode and the digital copying mode when the image write remote mode is not selected ($M_1 = 0$), since the copying operation can be performed using another copying machine which has been arranged already in an office.

It is to be noted that the mode start flag $T_4$ of the digital copying mode ($M_4 = 1$) can be set by priority to the analogue copying mode, however, the start flag $T_4$ can not be set when there is set at least one of the mode set flags $M_1$ to $M_3$ of the other modes. Further, the start flag $T_5$ of the analogue copying mode ($M_5 = 1$) can not set when there is set at least one of the mode set flags $M_1$ to $M_4$ of the other modes. Thus, the digital copying mode takes priority of the analogue copying mode because the analogue copying process can be executed using another conventional analogue copying machine which has been arranged already in an office.

Furthermore, the image write flag U is a flag for indicating that at least one of the start flags $T_1$ and $T_2$ of the image write mode and the image write remote mode has been set already.

The operation of the control system of the the electrophotographic copying machine 1 will be described below with reference to FIGS. 11a to 11d.

<Mode selection process>

Figure 11A:
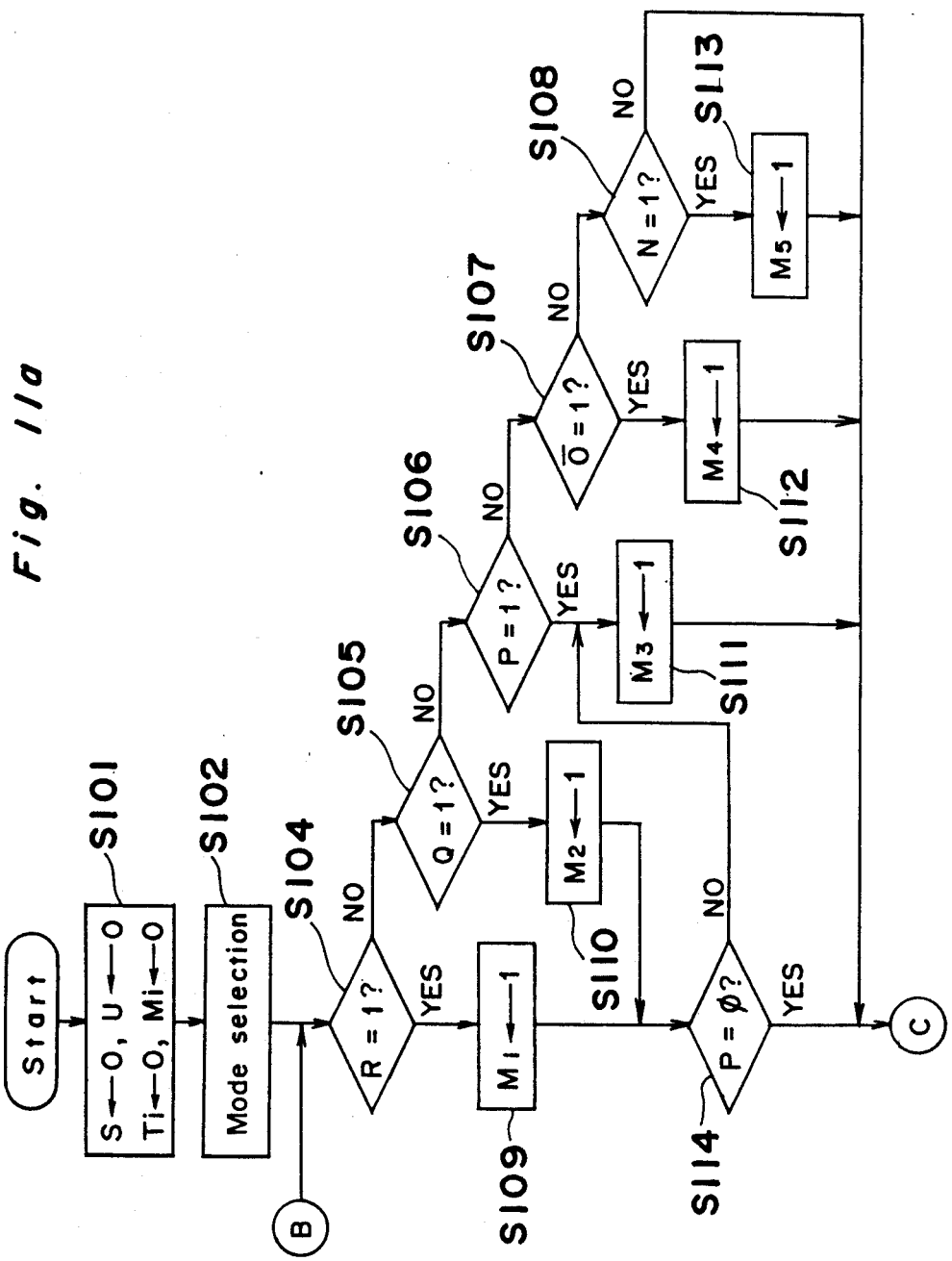
FIGS. 11a to 11d are flowcharts showing a main routine of a main system controller shown in FIG. 10.
Figure 11B:
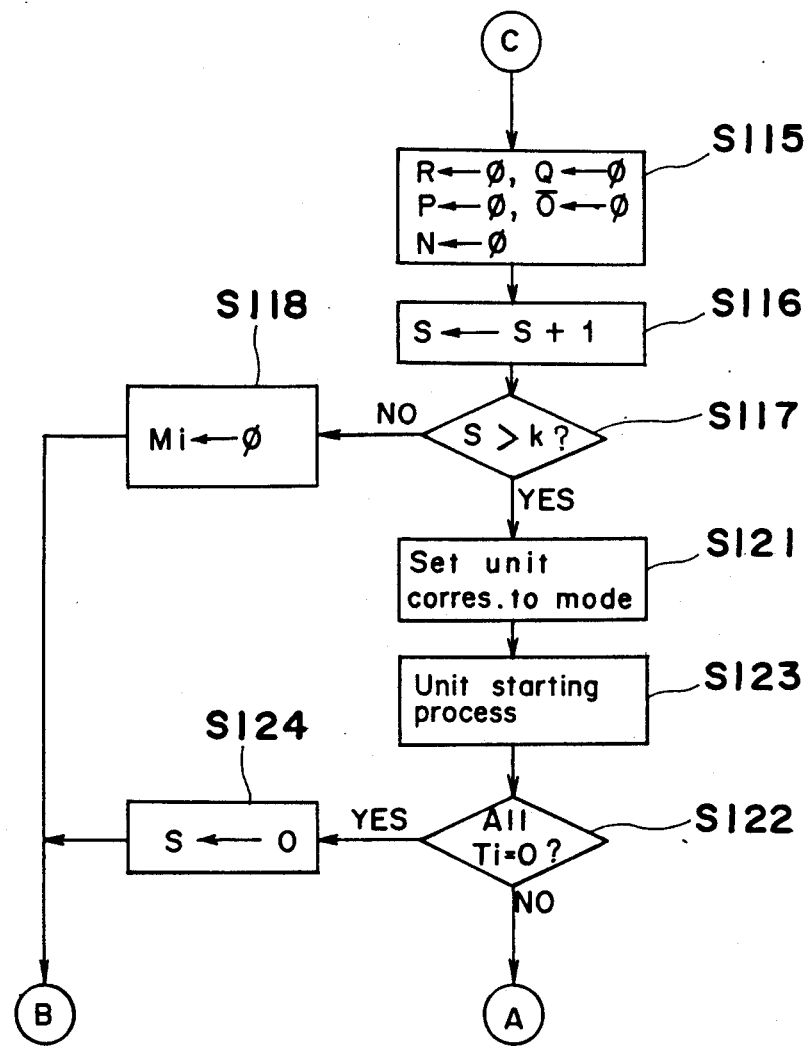
Figure 11C:
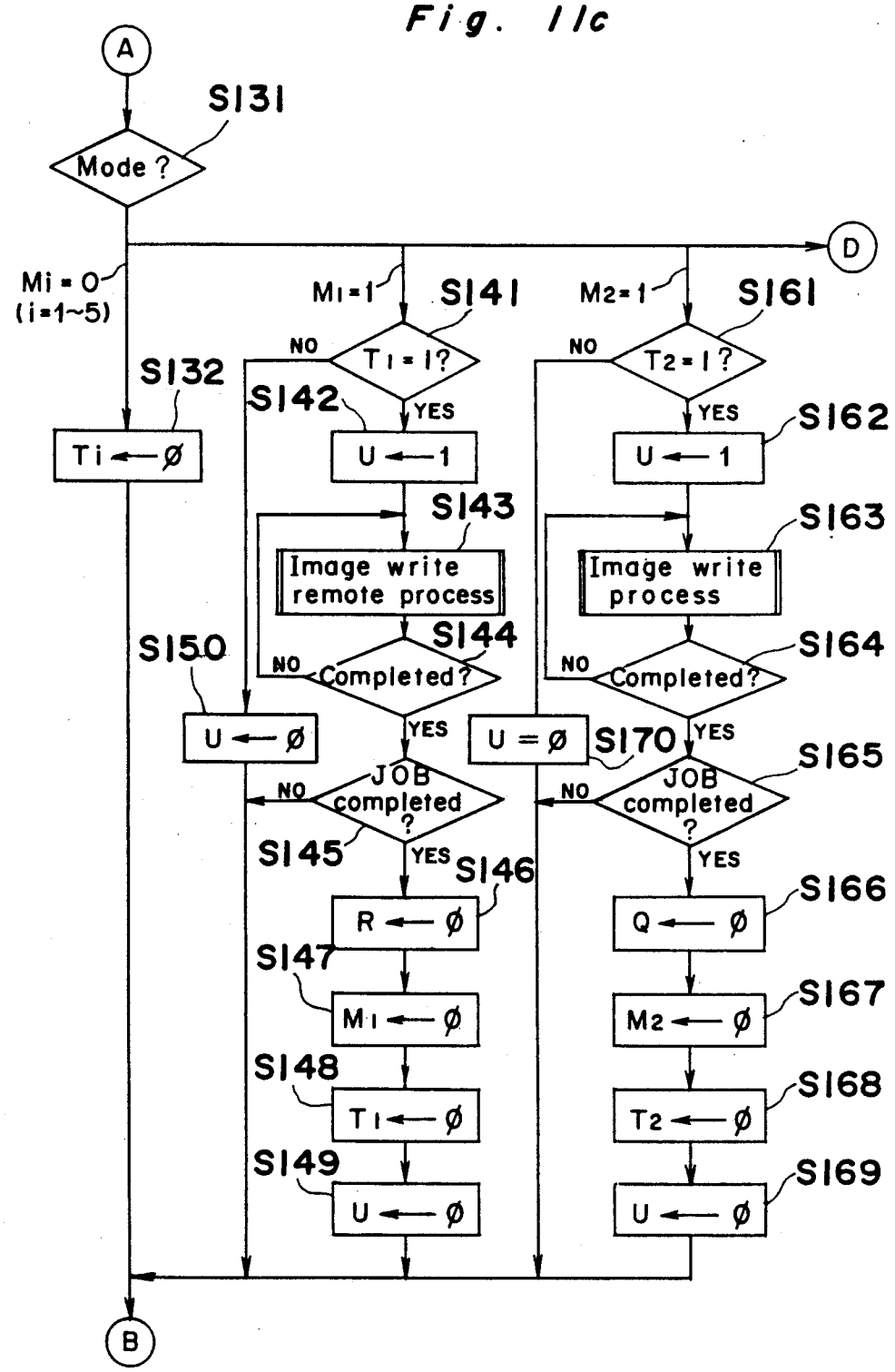
Figure 11D:
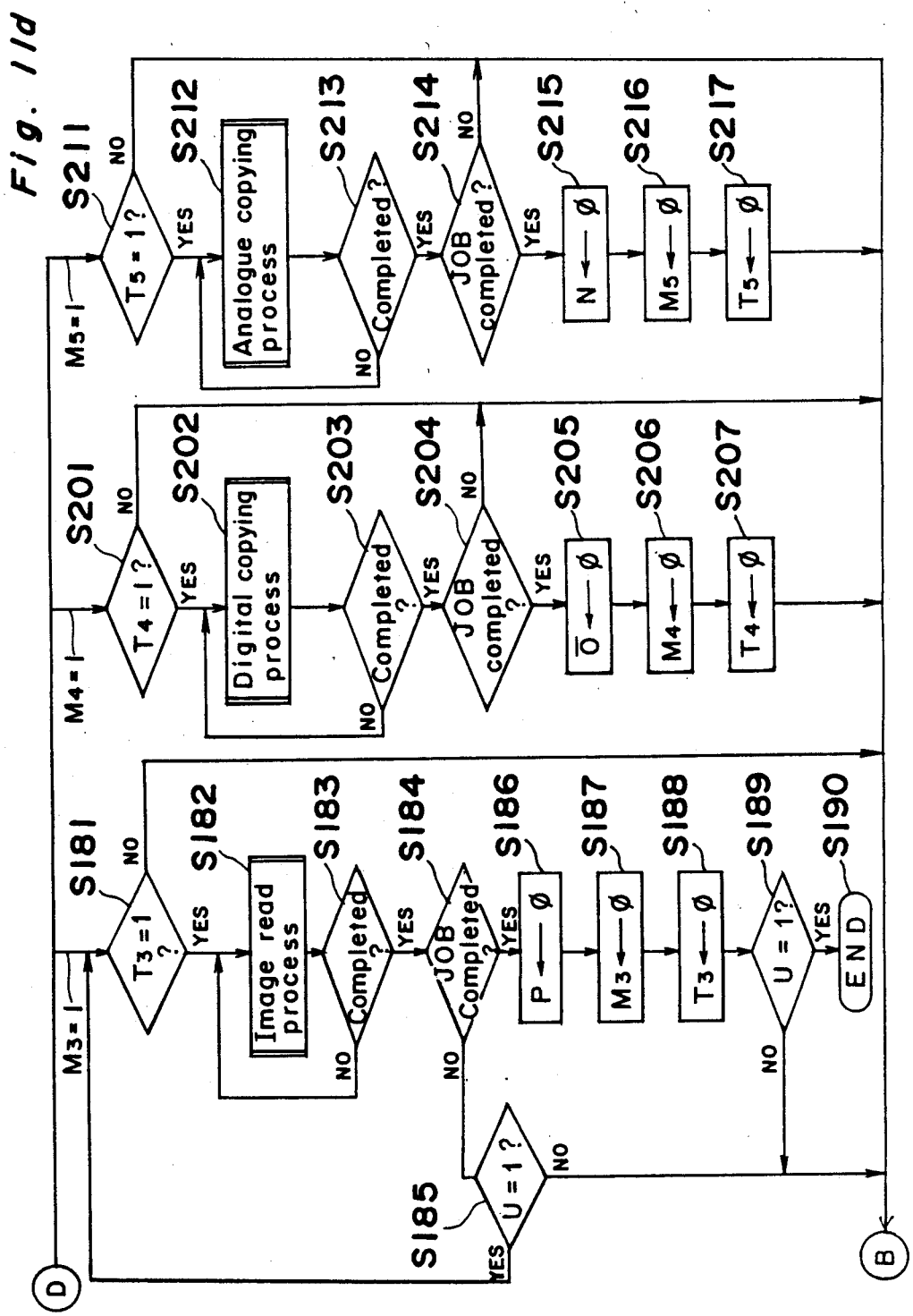

Referring to FIG. 11a, when the electrophotographic copying machine 1 is turned on so as to supply the power thereto, a check counter S described in detail later is reset to zero and the flags U, $T_i$ and $M_i$ (i = 1 to 5) are reset to zero at step S101. Thereafter, a warm-up process is executed in the manner similar to that of the conventional copying machine, however, the description thereof is omitted therein.

When the operator selects one or plural operation modes to be used, using the mode selection switches (not shown) arranged on the operation panel 106 at step S102, one or plural of the mode selection flags N, O, P, Q and R corresponding to one or plural of the modes selected at step S102 are set at one. In this case, as described above referring to Table 1, the flag R of the image write remote mode is different from the other flags in such a point that the flag R of the image write remote mode is set at one by the command sent from the external unit, and also the flag R is set at one even though the other mode process is in execution. The mode selection switches which are arranged on the operation panel 106 are constituted so that the flags P and Q of the image read mode and the image write mode can be set at one simultaneously, however, only one of the analogue copying mode, the digital copying mode and the image read mode can be set, or only one of the analogue copying mode, the digital copying mode and the image write mode can be set.

<Setting process of mode selection flags>

After step S102, the setting process of the mode selection flags of steps S104 to S114 is executed as follows.

First of all, the mode selection flags are set in a predetermined priority order according to the mode selection flags R, Q, P, 0 and N at steps S104 to S108. Namely, it is judged whether or not the flags R, Q, P, O and N of the image write remote mode, the image write mode, the image read mode, the digital copying mode and the analogue copying mode are one at steps S104 to S108, respectively.

When the flag R of the image write remote mode which is set responsive to the command sent from the external unit is one (Yes at step 104), the mode set flag $M_1$ is set at one at step S109, and then, the program flow goes to step S114. Also, when the flag R is zero (No at step S104) and the flag Q of the image write mode is one (Yes at step 105), the mode set flag $M_2$ is set at one at step S110, and then, the program flow goes to step S114. Further, when the flags R and Q are zero (No at both steps S104 and S105) and the flag P of the image read mode is one (Yes at step S106), the mode set flag $M_3$ is set at one at step S111, and then, the program flow goes to step S115. Furthermore, when the flags R, Q and P are zero (No at all steps S104 to S106) and the flag O of the digital copying mode is one (Yes at step S107), the mode set flag $M_4$ is set at one at step S112, and then, the program flow goes to step S115. Further, when the flags R, Q, P and O ar zero (No at all steps S104 to S107) and the flag N of the analogue copying mode is one (Yes at step S108), the mode set flag $M_5$ is set at one at step S113, and then, the program flow goes to step S115. Furthermore, when all the mode selection flags R, Q, P, O and N are zero, namely, when any operation mode is not selected (No at all steps S104 to S108), the program flow goes to step S115, without setting any mode set flag.

Thus, the mode set flags $M_1$ to $M_5$ are set in a priority orders of the image write remote mode, the image write mode, the image read mode, the digital copying mode, and the analogue copying mode. Even though all the operation modes or plural operation modes are selected, only the mode set flag $M_i$ of the mode having a higher priority order is set by the decision branches S104 to S108, and the mode set flags $M_i$ of the modes having a lower priority order are not set. It is to be noted that the mode set flag $M_3$ of the image read mode can be set even though either the flag $M_1$ or $M_2$ of the image write remote mode or the image write mode is set. Therefore, after the mode set flag $M_1$ or $M_2$ is set at step S109 or S110, it is judged whether or not the mode selection flag P is zero at step S114. When the flag P is not zero (No at step S114), the program flow goes to step S111 since the flag P of the image read mode has been set, and then, the mode set flag $M_3$ is also set at one. On the other hand, when the flag P is zero (Yes at step S114), the program flow goes to step S115.

After setting one or plural mode set flags $M_i$, all the mode selection flags R, Q, P, O and N are reset to zero at step S115, and then, the count of the check counter S is incremented by one at step S116. Thereafter, the program flow goes to step S117.

The decision branch S117 is provided for checking the count of the check counter S. Namely, at step S117, it is judged whether or not the count of the check counter S is larger than a predetermined value k. When the count of the check counter S is equal to or smaller than the value k (No at step S117), all the mode set flags $M_i$ are reset to zero at step S118, and then, the program flow goes back to step S104. Thereafter, the aforementioned setting process of the mode set flags is executed again in order to set one or plural modes which have been selected up to now using the mode selection switches of the operation panel 106.

In the present preferred embodiment, since a time required for executing one cycle of a mode setting process of steps S104 to S118 is about 10 msec., the value k is set at 100 so as to repeat the mode setting process for about one sec., however, the present invention is not limited to this, and the value k may be set at any value larger than zero.

The reason why the mode setting process is repeated is to prevent a degradation of the units due to switching between the analogue copying mode and the digital copying mode according to an unnecessary mode selection, for example, a degradation of the units due to a mechanical movement of the movable units such as pivotable reflection mirror.

<Unit setting process>

After the mode setting process is repeated 101 times, or after a time of about one sec. has passed since the process of step S101 is executed, the count of the check counter S becomes 101 (Yes at step S117), and then, the units are set in a predetermined state corresponding one or plural modes which have been selected at step S121. Concretely, in the analogue copying mode, the units arranged within the the electrophotographic copying machine 1 are set so as to perform the analogue copying operation, for example, the pivotable reflection mirror 14 is rotated so as to be located at the position P1. Furthermore, in the digital copying mode, these units are set so as to perform the digital copying operation, for example, the pivotable reflection mirror 14 is rotated so as to be located at the position P2.

<Unit starting process>

After the units are set in a predetermined state corresponding to the selected modes at step S121, a unit starting process is executed at step S123, and then, it is judged whether or not the units can be started. If the units can be started, one or plural mode start flags $T_i$ corresponding to the modes of the mode set flags which have been set are set at one as shown in Table 1. Otherwise, all the mode start flags $T_i$ are reset to zero.

In the case that one or plural mode start flags $T_i$ are set at one, respective mode start flags $T_1$ and $T_3$ are set at one, unconditionally, if the mode set flags $M_1$ and $M_3$. However, the mode start flag $T_2$ is set at one, only when $M_2=1$ and $M_1=0$. The mode start flag $T_4$ is set at one, only when $M_4=1$ and all the flags $M_1$ to $M_3=0$. The mode start flag $T_5$ is set at one, only when $M_5=1$ and the all the flags $M_1$ to $M_4=0$. Namely, the process of the image write remote mode or the image read mode is started independent of the selection state of the other modes. However, the process of the image write mode is started, only when the image write remote mode is not selected. The process of the digital copying mode is started, only when all of the image read mode, the image write mode and the image write remote mode are not selected. The process of analogue coping mode is started, only when the other modes are not selected.

After executing the unit starting process at step S123, the program flow goes to step S122, and then, it is judged whether or not all the mode start flags $T_i$ are one at step S122. When the all the mode start flags $T_i$ are zero (Yes at step S122), the count of the check counter S is reset to zero at step S124, and then, the program flow goes back to step S104 and the aforementioned mode setting process is executed again. On the other hand, when the at least one mode start flag $T_i$ is one (No at step S122), the program flow goes to a mode check process starting from step S131.

<Mode check process>

At step S131, the operation mode is checked based on the mode set flags $M_i$, and the process of each mode is executed in the priority order shown in Table 3, in the manner similar to that of the unit starting process. The reason why the operation mode is checked although the mode start flags $T_i$ are checked at step S122 is that the setting state of the mode set flags may be changed when interruption process may be executed as described in detail later.

In the mode check process, when it is judged that all the mode set flags $M_i$ ($i=1$ to 5) are zero, all the mode start flags $T_i$ are reset to zero at step S132, and then, the program flow goes back to step S104 and the mode setting process is executed.

On the other hand, when at least one mode set flag $M_i$ is one, as described below, the program flow goes to either steps S141, S161, S181, S201, or S211, according to the mode set flag $M_i$.

<Image write remote mode>

Figure 12:
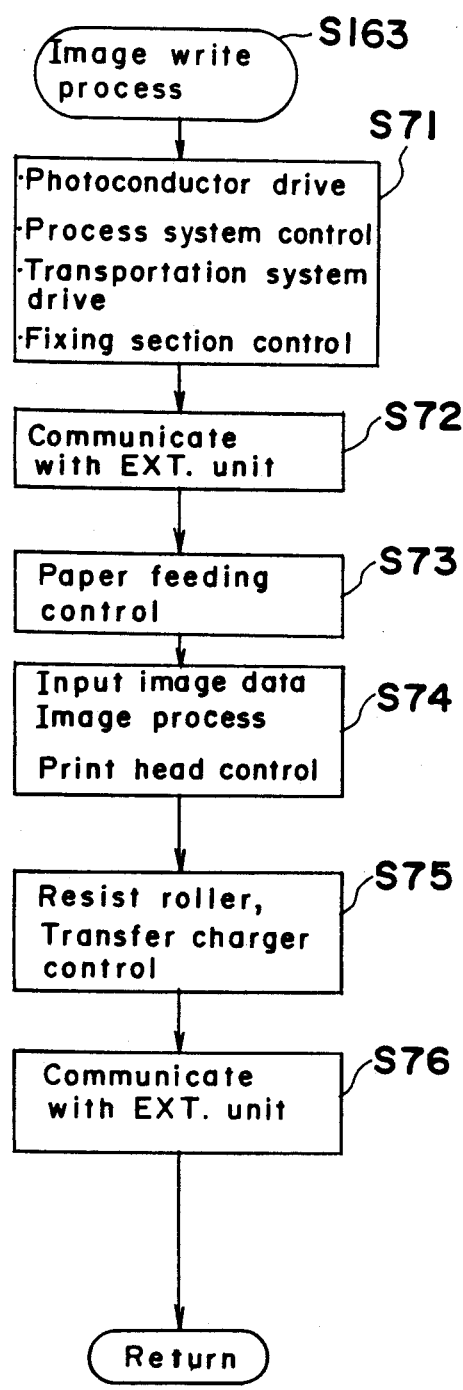
FIG. 12 is a flowchart showing an image write process shown in FIG. 11c.

In the mode check process of step S131, when it is judged that the mode set flag $M_1$ is one, the program flow goes to step S141, and then, it is judged whether or not the mode start flag $T_1$ is one. Normally, since the mode start flag $T_1$ has been set at one in the unit starting process of step S123 (Yes at step 141), the image write flag U representing that either the process of the image write mode or the image write remote mode has been started is set at one at step S142, and then, the process of the image write remote mode similar to that of the image write mode shown in FIG. 12 is started at step S143. On the other hand, when the mode start flag $T_1$ is zero (No at step S141), the image write flag U is reset to zero at step S150, and then, the program flow goes back to step S104.

In the image write remote process, when a predetermined partial routine thereof is completed, the processing state thereof is checked by a decision branch S144, however, the image write remote process is executed continuously until the process of one cycle or one page is completed. After the process of one cycle is completed (Yes at step S144), it is judged whether or not the JOB of all the pages is completed at step S145, in other words, it is judged whether or not there is a residual JOB or a process of a residual pages to be processed at step S145. When the JOB of all the pages is not completed (No at step S145), the program flow goes back to step S104, and then, the mode setting process is executed again. Meanwhile, when the other modes are not selected, the results at all the decision branches of steps S104 to S104 become No, and then, the program flow goes to step S115. Thereafter, the count of the check counter S is incremented by one so as to be 102 at step S116, and then, the result at the decision branch of step S117 becomes Yes. Then, the unit setting process is executed at step S121, however, any operation is not performed therein since the image write remote mode has been selected already. Thereafter, since $T_1=1$, the result at the decision branch of step S122 becomes No, and then, the program flow goes to the mode check process of step S131.

The mode check process is repeated $(k+1)$ times upon the first process, however, the mode check process is executed only once, and these processes from steps S145 through step S104 to step S122 can be executed for a time interval slightly larger than 10 msec..

Furthermore, when it is judged that the JOB of all the pages is completed at step S145, all the flags R, $M_1$, $T_1$ and U which have been set in the process of the image write remote mode are reset to zero at steps S146 to S149, and then, the program flow goes to the mode setting process starting from step S104. At that time, since the mode start flag $T_1=0$ (Yes at step S122), the count of the check counter S is reset to zero at step S124, the operation mode becomes completely initial state.

Furthermore, when the process of the image write remote mode is executed in an interruption process of the digital copying mode or the analogue copying mode, as described in detail later, the flags $M_4$ and $T_4$ are one or the flags $M_5$ and $T_5$ are one, and each state of the units is recovered at step S121, and the process of the original operation mode is started.

<Image write mode>

The process of the image write process is executed in the manner fundamentally similar to that of the image write remote process.

In the mode check process of step S131, when it is judged that the mode set flag $M_2$ is one, the program flow goes to step S161, and then, it is judged whether or not the mode start flag $T_2$ is one. Normally, since the mode start flag $T_2$ has been set at one in the unit starting process of step S123 (Yes at step S161), the image write flag U is set at one at step S162, and then, an image write process shown in FIG. 12 is started at step S163. On the other hand, when the mode start flag $T_2$ is zero (No at step S161), the image write flag U is reset to zero at step S170, and then, the program flow goes back to step S104.

In the image write process, when a predetermined partial routine is completed, the processing state thereof is checked by a decision branch of step S164, however, the image write process is executed continuously until the process of one cycle or one page is completed. After the process of one cycle is completed (Yes at step S164), it is judged whether or not the JOB of all the pages is completed at step S165, in other words, it is judged whether or not there is a residual JOB or a process of a residual pages to be processed at step S165. When the JOB of all the pages is not completed (No at step S165), the program flow goes back to step S104, and then, the mode setting process is executed. Meanwhile, when the other modes are not selected, the results at all the decision branches of steps S104 to S108 become No, and then, the program flow goes to step S115. Thereafter, the count of the check counter S is incremented by one so as to be 102 at step S116, and then, the result at the decision branch of step S117 becomes Yes. Then, the unit setting process is executed at step S121, however, any operation is not performed therein since the image write mode has been selected already. Thereafter, since $T_2=1$, the result at the decision branch of step S122 becomes No, and then, the program flow goes to the mode check process of step S131.

The mode check process is repeated $(k+1)$ times upon the first process, however, the mode check process is executed only once, and these processes from steps S165 through step S104 to step S122 can be executed for a time interval slightly longer than 10 msec..

Furthermore, when it is judged that JOB of all the pages is completed at step S165, all the flags Q, $M_2$, $T_2$ and U which have been set in the process of the image write mode are reset to zero at steps S166 to S169 in the manner similar to that of the image write remote mode, and then, the program flow goes back to the mode setting process starting from step S104. At that time, since all the mode start flag $T_i=0$ (Yes at step S122), the count of the check counter S is reset to zero at step S124, the operation mode becomes completely initial state.

In the case that the process of one cycle is completed and the program flow goes back to the mode setting process, when the image write remote mode has been selected responsive to the command sent from the external unit, the mode set flag $M_1$ becomes one since the mode selection flag R is one (Yes at step S104), and then, the interruption process of the image write remote mode is permitted. At that time, if the unit starting process has been executed in the image write remote mode, the mode start flag $T_1$ has been set at one (No at step S122), and then, the process of the image write remote mode can be executed. However, when the units can not be started ($T_1=0$) although the image write remote mode is selected, the result of the decision branch of step S141 becomes No, and then, the program flow enters a waiting routine in which any process is not executed. Then, the image write flag U is reset to zero at step S150, and the main system controller 101 becomes a waiting state until the units are started in the image write remote mode.

When the image write remote process which has been started by the interruption process is completed, the flags R, $M_1$, $T_1$ and U relating to the image write remote process are reset to zero at steps S146 to S149, and then, the program flow goes back to the mode setting process starting from step S104. At that time, if the other modes are not selected, all the mode selection flags R, Q, P, O and N are zero, and then, the results at all the decision branches of steps S104 to S104 become No. Therefore, the mode set flags $M_i$ is not set newly, however, the process of the image write mode is started again since both the mode set flag $M_2$ and the mode start flag $T_2$ of the image write write mode are still one.

In the present preferred embodiment, the units are always started in the interruption mode, and there is not a particular protection process. If necessary, there may be a counter for counting the number of loop in the waiting process at step S150. In this case, when the count of the counter becomes a predetermined value, the mode set flag R is reset to zero so as to cancel the interruption mode.

Furthermore, when the process of the image write mode is executed in the interruption process which is executed in the digital copying mode or the analogue copying mode, as described above, the flags $M_4$ and $T_4$ are one or the flags $M_5$ and $T_5$ are one, and each state of the units is recovered at step S121, and the process of the original operation mode is started.

<Image read mode>

The process of the image read mode can be executed even though the process of the image write mode or the image write remote mode is in execution. Namely, as described above, the program flow passes through the decision branch of step S106, only when both the image write remote mode and the image write mode is not selected. However, even though either the image write remote mode or the image write mode is selected, it is judged whether or not the image read mode has been selected by the decision branch of step S114. When the image read mode is selected (P=1) (Yes at step S114), the mode set flag $M_3$ is set at one at step S111. Thereafter, in the unit starting process, the mode start flag $T_3$ of the image read mode is set at one at step S123.

Furthermore, if the image read mode is selected while the process of the other mode is in execution, the result of the decision branch of step S106 of the mode setting process becomes Yes, and then, the mode set flag $M_3$ is set at one at step S111. In this case, if only the image read mode is selected and the units are not started, the result at the decision branch of step S181 becomes No since the mode start flag $T_3=0$, and then, the process of the image read mode is not executed at step S182.

Figure 13:
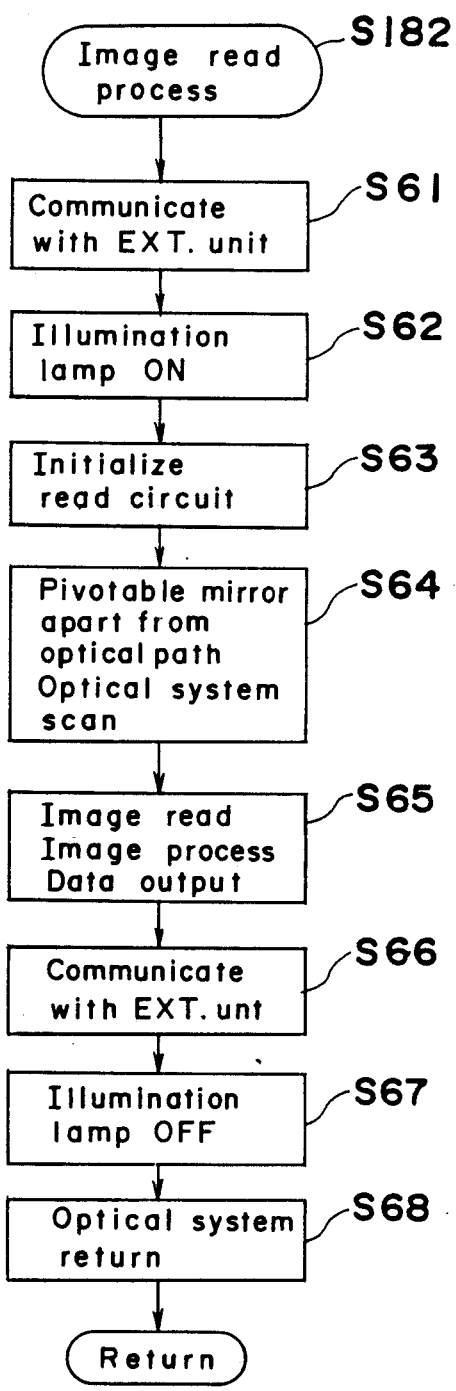
FIG. 13 is a flowchart showing an image read process shown in FIG. 11d.

On the other hand, if the units is started and $T_3=1$, the result at the decision branch of step S181 becomes Yes, and the image read process shown in FIG. 13 is executed continuously until the process of all the pages is completed at steps S182 and S183 as follows.

When the image read process of one cycle is completed (Yes at step S183), it is judged whether or not the JOB of all the pages is completed at step S184, in other words, it is judged whether or not there is residual JOB or a process of residual pages to be processed at step S184. When the JOB of all the pages is not completed (No at step S184), it is judged whether or not the image write process is in execution simultaneously, namely, the image write flag U is one at step S185. At that time, if either the image write process or the image write remote process is in execution, the image write flag U is one which has been set at steps S142 or S162. Therefore, the result of the decision branch S185 becomes Yes, and then, the image read process starting from step S181 is executed again. Namely, when either the process of the image write remote mode or the image write mode is in execution simultaneously, only the process of the image read mode is executed among the operation modes since the program flow does not pass through the normal process routine, resulting in that a collision between two processes of the modes is avoided.

When there is completed the process of the image write mode or the image write remote mode which is executed simultaneously when the process of the image read mode is in execution, the image write flag U is reset to zero at step S149 or S169, and then, the result at the decision branch of step S185 becomes No, the image read process is started in the normal process routine.

Thereafter, when the image read process is completed, the result at the decision branch of step S184 becomes Yes, and then, the flags P, $M_3$ and $T_3$ relating to the image read mode are reset to zero at steps S186, S187 and S188. Thereafter, it is judged whether or not the image write flag U is one, namely, the process of the image write remote mode or the image write mode is in execution at step S189. When the process of both the image write remote mode and the image write mode are not in execution, namely, when the image write flag U is zero, the result at the decision branch of step S189 becomes No, the main system controller 101 becomes the initial state in the manner similar to that in the image write remote mode and the image write mode. On the other hand, when the process of the image write remote mode or the image write mode is in execution (Yes at step S189), the image read process is finished at step S190, and only the process of the image write remote mode or the image write mode which is in execution at present is executed continuously, as described above.

Thus, the process of the image read mode can be executed whether or not the process of the image write remote mode or the image write mode is in execution. Therefore, the efficiency upon using the electrophotographic copying machine 1 can be improved remarkably.

<Digital copying mode and Analogue copying mode>

Since the processes of both the digital copying mode and the analogue copying mode can be executed independent of the the other apparatuses when the operator directly operates only the electrophotographic copying machine 1, each priority order of both the processes is set so as to be lower than the other processes. In the digital copying process, special processes are performed such as an image editing process, and a white/black reverse process. On the other hand, a process similar to the analogue copying process of the electrophotographic copying machine 1 can be executed alternatively by another analogue copying machine which has been arranged already in offices. Therefore, the priority order of the analogue copying mode is set at the lowest order among those operation modes.

Furthermore, there are many common points between the operation in the unit setting process of the digital copying mode and that in the image write remote mode, the image write mode or the image read mode which have a higher priority order. In the present preferred embodiment, in order to obtain such an effect that the the degradation of the units is prevented as much as possible, there is decreased the number of times of the operation in the unit setting process when the operation mode is switched over from one mode to another mode, as follows.

In the mode setting process, when the image write remote mode, the image write mode and the image read mode which have a higher priority order are not selected and either the digital copying mode or the analogue copying mode is selected (Yes at step S107 or S104), the mode set flag $M_4$ or $M_5$ is set at one at step S112 or S113, and then, in the unit starting process, the mode start flag $T_4$ or $T_5$ is set at one at step S123.

In the digital copying process, when the mode set flag $M_4$ is one, the mode start flag $T_4$ is set at one at step S123. Therefore, the result at the decision branch of step S201 becomes Yes, and then, the digital copying process shown in FIG. 14 is started at step S202, and is executed continuously until the process of one cycle or one page is completed. After the process of one cycle is completed (Yes at step S203), it is judged whether or not the JOB of all the pages is completed at step S204, in other words, it is judged whether or not there is a residual JOB or a process of residual pages to be processed at step S204.

When the JOB of all the pages is not completed (No at step S204), the program flow goes back to the mode setting process starting from step S104. Meanwhile, when the other modes are not selected, the results at the decision branches of all steps S104 to S104 become No, and then, the program flow goes to step S115. Thereafter, the count of the check counter S is incremented by one so as to be 102 at step S116, and then, the result at the decision branch of step S117 becomes Yes, and the unit setting process is executed at step S121. However, since the digital copying mode has been selected already, any operation is not performed therein. Thereafter, since the mode start flag $T_4$ is one, the result at the decision branch of step S122 becomes No, and then, the program flow goes to the mode check process of step S131.

The mode check process is repeated (k+1) times upon the first process, however, the mode check process is executed only once, and these processes from step S204 through step S104 to step S122 can be executed for a time interval slightly larger than 10 msec..

Furthermore, when it is judged that the JOB of all the pages is completed at step S204, all the flags O, $M_4$ and $T_4$ relating to the digital copying mode are reset to zero at steps S205 to S207, and then, the program flow goes back to the mode setting process starting from step S104. At that time, since the mode start flag $T_i=0$ (Yes at step S122), and the count of the check counter S is reset to zero at step S124, the operation mode becomes complete initial state.

In the analogue copying process, when the mode set flag $M_5$ is one, the mode start flag $T_5$ is set at one at step S123. Therefore, the result at the decision branch of step S211 becomes Yes, and then, the analogue copying process shown in FIG. 15 is started at step S212, and is executed continuously until the process of one cycle or one page is completed. After the process of one cycle is completed (Yes at step S213), it is judged whether or not the JOB of all the pages is completed at step S214, in other words, it is judged whether or not there is a residual JOB or a process of residual pages to be processed at step S214.

When the JOB of all the pages is not completed (No at step S214), the program flow goes back to the mode setting process starting from step S104. Meanwhile, when the other modes are not selected, the results at the decision branches of all steps S104 to S104 become No, and then, the program flow goes to step S115. Thereafter, the count of the check counter S is incremented by one so as to be 102 at step S116, and then, the result at the decision branch of step S117 becomes Yes, and the unit setting process is executed at step S121. However, since the analogue copying mode has been set already, any operation is not performed therein. Thereafter, since the mode start flag $T_5$ is one, the result at the decision branch of step S122 becomes No, and then, the program flow goes to the mode check process of step S131.

The mode check process is repeated (k+1) times upon the first process, however, the mode check process is executed only once, and these processes from step S204 through step S104 to step S122 can be executed for a time interval slightly larger than 10 msec..

Furthermore, when it is judged that the JOB of all the pages is completed at step S214, all the flags N, $M_5$ and $T_5$ relating to the analogue copying mode are reset to zero at steps S215 to S217, and then, the program flow goes back to the mode setting process starting from step S104. At that time, since the mode start flag $T_i=0$ (Yes at step S122), and the count of the check counter S is reset to zero at step S124, the operation mode becomes complete initial state.

If an interruption process of the mode having a higher priority order than that of the digital copying mode or the analogue copying mode is executed while either the digital copying process or the analogue copying process is in execution, the process of the interruption mode having the higher priority order is executed by priority to that of the digital copying mode or the analogue copying mode, and then, the process of the digital copying mode or the analogue copying mode is suspended. Thereafter, when the process of the interruption mode is completed, the process of the digital copying mode or the analogue copying mode is started again automatically without selecting the digital copying mode or the analogue copying mode and without performing the unit starting process since the flags $M_4$ and $T_4$ have been set at one or the flags $M_5$ and $T_5$ have been set at one.

Image write process>

The image write process (step S163) will be described below with reference to FIG. 12. It is to be noted that the image write remote process (step S143) is similar to the image write process.

Referring to FIG. 12, first of all, at step S71, the photoconductive drum 21 is rotated, the electrophotographic process section is controlled as described above, the transportation section is driven, and the fixing section is controlled as described above. Thereafter, the communication with an external unit such as a host computer is performed at step S72, and a start signal for writing an image is received.

Thereafter, the paper feeding operation is controlled as described above at step S73, and then, the program flow goes to step S74. Then, an input process for receiving image data sent from the external unit is performed, the process for processing the received image data is performed, and the LED head 71 is controlled as described above. Thereafter, the resist roller 37 is controlled as described above, and the polarity of the transfer charger 26 is controlled at step S75. Finally, the communication with the external unit is performed at step S76, and then, the program flow returns to the main routine.

<Image read process>

The image read process (step S182) will be described below with reference to FIG. 13.

Referring to FIG. 13, first of all, the communication with an external unit such as a host computer is performed at step S61. After a start signal for reading image data is received, the illumination lamp 4 is turned on at step S62, and the image read circuit is initialized at step S63.

Thereafter, the pivotable reflection mirror 14 is rotated so as to be located at the position P2 and to be apart from the optical path, and then, a document set on the document table 2 is scanned by the scan optical system at step S64. At that time, the image of the document is read by the CCD image sensor 61, and also the image process for the read image is executed. Then, the processed image data are outputted to the external unit at step S65.

When the operation for reading the document image is completed, an end signal is outputted to the external unit at step S66, and the illumination lamp 4 is turned off at step S67. Finally, the illumination unit 3 and the mirror unit 6 of the scan optical system returns the predetermined home position at step S68. Then, the program flow returns to the main routine.

<Digital copying process>

The digital copying process (step S202) will be described below with reference to FIG. 14.

Referring to FIG. 14, first of all, the illumination lamp 4 is controlled, the photoconductive drum 21 is rotated, the electrophotographic process section is driven, the transportation section is driven, and the fixing section is controlled, as described above, at step S81. Thereafter, the paper feeding section is controlled at step S82.

Then, the pivotable reflection mirror 14 is rotated so as to be located at the position P2 and to be apart from the optical path, and a document set on the document table 2 is scanned by the scan optical system at step S83. At that time, the document image is read by the CCD image sensor 61, and the process for processing the read image data is performed. Also, the LED head 71 is controlled so as to write dot images according to the processed image data at step S84. Then, the resist roller 37 is controlled so as to feed a sheet of copying paper to the transfer section, and the polarity of the transfer charger 26 is set at positive polarity at step S85.

Finally, the scan optical system returns the predetermined home position at step S86. Then, the program flow returns to the main routine.

<Analogue copying process>

The analogue copying process (step S212) will be described below with reference to FIG. 15.

Referring to FIG. 15, first of all, the illumination lamp 4 is controlled, the photoconductive drum 21 is rotated, the electrophotographic process section is driven, the transportation section is driven, and the fixing section is controlled, as described above, at step S51. Thereafter, the paper feeding section is controlled at step S52.

Then, the pivotable reflection mirror 14 is rotated so as to be located at the position P1, and a document set on the document table 2 is scanned by the scan optical system at step S53. Thereafter, the resist roller 37 is controlled so as to feed a sheet of copying paper to the transfer section, and the transfer charger 26 is controlled at step S54.

Finally, the scan optical system returns the predetermined home position at step S55. Then, the program flow returns to the main routine.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

TABLE 1

| Operation mode | Mode selection flag | Setting condition of mode selection flag |
|---|---|---|
| Image write remote mode | R = 1 | Flag R can be set independent of the other flags. |
| Image write mode | Q = 1 | Flags P and Q can be set simultaneously. |
| Image read mode | P = 1 | |
| Digital copying mode | O = 1 | Only one of flags N, O and P, or only one of flags N, O and Q can be set. |
| Analogue copying mode | N = 1 | |

TABLE 2

| Operation mode | Mode set flag | Mode start flag | Setting condition of mode start flag |
|---|---|---|---|
| Image write remote mode | $M_1$ | $T_1$ | — |
| Image write mode | $M_2$ | $T_2$ | $M_1 = 0$ |
| Image read mode | $M_3$ | $T_3$ | — |
| Digital copying mode | $M_4$ | $T_4$ | all $M_1$ to $M_3 = 0$ |
| Analogue copying mode | $M_5$ | $T_5$ | all $M_1$ to $M_4 = 0$ |

TABLE 3

| $M_1$ | $M_2$ | $M_3$ | $M_4$ | $M_5$ | Operation mode to be executed |
|---|---|---|---|---|---|
| 1 | X | X | X | X | Image write remote mode |
| 0 | 1 | X | X | X | Image write mode |
| X | X | 1 | X | X | Image read mode |
| 0 | 0 | 0 | 1 | X | Digital copying mode |
| 0 | 0 | 0 | 0 | 1 | Analogue copying mode |

Note. X: any value of either 1 or 0

What is claimed is:

1. An image processing apparatus comprising:
an image sensor for reading an image of a document set on a document table and for outputting electric signals corresponding to the image of the document;
a photoconductor;
optical means for forming an image reflected from a document set on said document table onto said photoconductor;
receipt means for receiving electric signals sent from an external unit;
an exposure head for forming dot images on said photoconductor responsive to the electric signals sent from either of said image sensor and said receipt means;
mode selection means for selecting at least one or plural operation modes of said image processing apparatus and for outputting a mode selection signal representing the selected one or plural operation modes,
the operation modes including: a first operation mode for driving said exposure head to form dot images on said photoconductor responsive to the electric signals sent from said receipt means so as to form an electrostatic latent image thereon, a second operation mode for driving said exposure head to form dot images on said photoconductor responsive to the electric signals sent from said image sensor so as to form an electrostatic latent image thereon, and a third operation mode for enabling said optical means to form an image reflected from a document set on said document table onto said photoconductor so as to form an electrostatic latent image thereon; and
control means for executing the processes of the selected one or plural operation modes responsive to the mode selection signal, said control means executing the process of the first operation mode by priority to the other operation modes when plural operation modes including the first operation mode are selected by said mode selection means.

2. The image processing apparatus as claimed in claim 1,
wherein said control means suspends the process of the operation mode being in execution other than the first operation mode to execute the process of the first operation mode when the first operation mode is selected by said mode selection means.

3. The image processing apparatus as claimed in claim 2,
wherein said control means controls starts in execution again the process of the operation mode which has been suspended after the process of the first operation mode is completed.

4. The image processing apparatus as claimed in claim 1,
wherein said image processing apparatus further comprises:
developing means for developing the electrostatic latent image formed on said photoconductor into a visible toner image with toner; and
transferring means for transferring the visible toner image onto paper.

5. An image processing apparatus comprising:
an image sensor for reading an image of a document set on a document table and for outputting electric signals corresponding to the image of the document;

transmission means for transmitting the electric signals outputted from said image sensor, to an external unit;

a photoconductor;

optical means for forming an image reflected from a document set on said document table onto said photoconductor;

receipt means for receiving electric signals sent from an external unit;

an exposure head for forming dot images on said photoconductor responsive to the electric signals sent from either of said image sensor and said receipt means;

mode selection means for selecting at least one or plural operation modes of said image processing apparatus and for outputting a mode selection signal representing the selected one or plural operation modes, the operation modes including: a first operation mode for driving said exposure head to form dot images on said photoconductor responsive to the electric signals sent from said receipt means so as to form an electrostatic latent image thereon, a second operation mode for driving said exposure head to form dot images on said photoconductor responsive to the electric signals sent from said image sensor so as to form an electrostatic latent image thereon, a third operation mode for enabling said optical means to form an image reflected from a document set on said document table onto said photoconductor so as to form an electrostatic latent image thereon, and a fourth operation mode for enabling said transmission means to transmit electric signals outputted from said image sensor, to an external unit; and control means for executing the processes of the selected one or plural operation modes responsive to the mode selection signal, said control means executing the processes of the first operation mode and the fourth operation mode simultaneously when both the first operation mode and the fourth operation mode are selected by said mode selection means.

6. The image processing apparatus as claimed in claim 5, wherein said image processing apparatus further comprises:

developing means for developing the electrostatic latent image formed on said photoconductor into a visible toner image with toner; and transferring means for transferring the visible toner image onto paper.

* * * * *